US009621917B2

(12) United States Patent
Kottke et al.

(10) Patent No.: US 9,621,917 B2
(45) Date of Patent: Apr. 11, 2017

(54) CONTINUOUS BLOCK TRACKING FOR TEMPORAL PREDICTION IN VIDEO ENCODING

(71) Applicant: Euclid Discoveries, LLC, Concord, MA (US)

(72) Inventors: Dane P. Kottke, Durham, NC (US); John J. Guo, Arcadia, CA (US); Jeyun Lee, Austin, TX (US); Sangseok Park, Flower Mound, TX (US); Christopher Weed, Sudbury, MA (US); Justin Kwan, Brighton, MA (US); Nigel Lee, Chestnut Hill, MA (US)

(73) Assignee: EUCLID DISCOVERIES, LLC, Concord, MA (US)

( * ) Notice: Subject to any disclaimer, the term of this patent is extended or adjusted under 35 U.S.C. 154(b) by 340 days.

(21) Appl. No.: 14/532,947

(22) Filed: Nov. 4, 2014

(65) Prior Publication Data
US 2015/0256850 A1    Sep. 10, 2015

Related U.S. Application Data

(60) Provisional application No. 61/950,784, filed on Mar. 10, 2014, provisional application No. 62/049,342, filed on Sep. 11, 2014.

(51) Int. Cl.
*H04B 1/66* (2006.01)
*H04N 7/12* (2006.01)
(Continued)

(52) U.S. Cl.
CPC ........... *H04N 19/56* (2014.11); *H04N 19/105* (2014.11); *H04N 19/117* (2014.11);
(Continued)

(58) Field of Classification Search
CPC ............................ H04N 19/56; H04N 19/139
See application file for complete search history.

(56) References Cited

U.S. PATENT DOCUMENTS 5,117,287 A    5/1992  Koike et al.
5,586,200 A   12/1996  Devaney et al.
(Continued)

FOREIGN PATENT DOCUMENTS

EP    0 614 318 A2    9/1994
EP    1 124 379 A2    8/2001
(Continued)

OTHER PUBLICATIONS

Notification Concerning Transmittal of International Preliminary Report on Patentability for PCT/US2014/063913, titled "Continuous Block Tracking for Temporal Prediction in Video Encoding," Mailing Date: Sep. 22, 2016.
(Continued)

*Primary Examiner* — Joseph Ustaris
*Assistant Examiner* — Rebecca Volentine
(74) *Attorney, Agent, or Firm* — Hamilton, Brook, Smith & Reynolds, P.C.

(57) ABSTRACT

Continuous block tracking (CBT) tracks macroblock locations over reference frames to produce better inter-predictions than conventional block-based motion estimation/compression. CBT includes frame-to-frame tracking, estimating motion from a frame to a previous frame, and continuous tracking, related frame-to-frame motion vectors to block tracks. Frame-to-frame tracking may include block based or hierarchical motion estimations. CBT combined with enhanced predictive zonal search may create unified motion estimation. Accumulated CBT results may form trajectories for trajectory-based CBT predictions. Metrics measuring continuous track and motion vector quality can assess rela-
(Continued)

Unified motion estimation via combination of
continuous block tracking (CBT)
and enhanced predictive zonal search (EPZS)

tive priority of CBT prediction against non-tracker-based predictions and to modify encoding choices. Continuous tracks can be analyzed for goodness-of-fit to translational motion models, with outliers removed from encoding. Translational motion models can be extended to entire frames in adaptive picture type selection. Outputs from CBT used in look-ahead processing, via look-ahead tracking, may provide rate control and scene change detection for the current frame being encoded.

20 Claims, 10 Drawing Sheets

(51) Int. Cl.
H04N 11/02 (2006.01)
H04N 11/04 (2006.01)
H04N 19/56 (2014.01)
H04N 19/517 (2014.01)
H04N 19/117 (2014.01)
H04N 19/105 (2014.01)
H04N 19/139 (2014.01)
H04N 19/176 (2014.01)
H04N 19/513 (2014.01)
H04N 19/527 (2014.01)
H04N 19/53 (2014.01)
H04N 19/58 (2014.01)

(52) U.S. Cl.
CPC ......... *H04N 19/139* (2014.11); *H04N 19/176* (2014.11); *H04N 19/513* (2014.11); *H04N 19/517* (2014.11); *H04N 19/527* (2014.11); *H04N 19/53* (2014.11); *H04N 19/58* (2014.11)

(56) References Cited

U.S. PATENT DOCUMENTS

| | | | |
|---|---|---|---|
| 5,608,458 A | 3/1997 | Chen et al. |
| 5,710,590 A | 1/1998 | Ichige et al. |
| 5,748,247 A | 5/1998 | Hu |
| 5,760,846 A | 6/1998 | Lee |
| 5,774,591 A | 6/1998 | Black et al. |
| 5,774,595 A | 6/1998 | Kim |
| 5,826,165 A | 10/1998 | Echeita et al. |
| 5,917,609 A | 6/1999 | Breeuwer et al. |
| 5,933,535 A | 8/1999 | Lee et al. |
| 5,969,755 A | 10/1999 | Courtney |
| 5,991,447 A | 11/1999 | Eifrig et al. |
| 6,044,168 A | 3/2000 | Tuceryan et al. |
| 6,061,400 A | 5/2000 | Pearlstein et al. |
| 6,069,631 A | 5/2000 | Tao et al. |
| 6,088,484 A | 7/2000 | Mead |
| 6,249,318 B1 | 6/2001 | Girod et al. |
| 6,256,423 B1 | 7/2001 | Krishnamurthy et al. |
| 6,307,964 B1 | 10/2001 | Lin et al. |
| 6,381,275 B1 | 4/2002 | Fukuhara et al. |
| 6,418,166 B1 | 7/2002 | Wu et al. |
| 6,546,117 B1 | 4/2003 | Sun et al. |
| 6,574,353 B1 | 6/2003 | Schoepflin |
| 6,608,935 B2 | 8/2003 | Nagumo et al. |
| 6,611,628 B1 | 8/2003 | Sekiguchi et al. |
| 6,614,466 B2 | 9/2003 | Thomas |
| 6,625,310 B2 | 9/2003 | Lipton et al. |
| 6,625,316 B1 | 9/2003 | Maeda |
| 6,640,145 B2 | 10/2003 | Hoffberg et al. |
| 6,646,578 B1 | 11/2003 | Au |
| 6,661,004 B2 | 12/2003 | Aumond et al. |
| 6,664,956 B1 | 12/2003 | Erdem |
| 6,711,278 B1 | 3/2004 | Gu et al. |
| 6,731,799 B1 | 5/2004 | Sun et al. |
| 6,731,813 B2 | 5/2004 | Stewart |
| 6,738,424 B1 | 5/2004 | Allmen et al. |
| 6,751,354 B2 | 6/2004 | Foote et al. |
| 6,774,917 B1 | 8/2004 | Foote et al. |
| 6,792,154 B1 | 9/2004 | Stewart |
| 6,842,483 B1 * | 1/2005 | Au .............. H04N 19/533 375/240.16 |
| 6,870,843 B1 | 3/2005 | Stewart |
| 6,909,745 B1 | 6/2005 | Puri et al. |
| 6,912,310 B1 | 6/2005 | Park et al. |
| 6,925,122 B2 | 8/2005 | Gorodnichy |
| 6,950,123 B2 | 9/2005 | Martins |
| 7,003,117 B2 | 2/2006 | Kacker et al. |
| 7,027,599 B1 | 4/2006 | Entwistle |
| 7,043,058 B2 | 5/2006 | Cornog et al. |
| 7,088,845 B2 | 8/2006 | Gu et al. |
| 7,095,786 B1 | 8/2006 | Schonfeld et al. |
| 7,158,680 B2 | 1/2007 | Pace |
| 7,162,055 B2 | 1/2007 | Gu et al. |
| 7,162,081 B2 | 1/2007 | Timor et al. |
| 7,164,718 B2 | 1/2007 | Maziere et al. |
| 7,173,925 B1 | 2/2007 | Dantu et al. |
| 7,184,073 B2 | 2/2007 | Varadarajan et al. |
| 7,227,893 B1 | 6/2007 | Srinivasa et al. |
| 7,352,386 B1 | 4/2008 | Shum et al. |
| 7,356,082 B1 | 4/2008 | Kuhn |
| 7,415,527 B2 | 8/2008 | Varadarajan et al. |
| 7,424,157 B2 | 9/2008 | Pace |
| 7,424,164 B2 | 9/2008 | Gondek et al. |
| 7,426,285 B2 | 9/2008 | Pace |
| 7,436,981 B2 | 10/2008 | Pace |
| 7,457,435 B2 | 11/2008 | Pace |
| 7,457,472 B2 | 11/2008 | Pace et al. |
| 7,508,990 B2 | 3/2009 | Pace |
| 7,574,406 B2 | 8/2009 | Varadarajan et al. |
| 7,606,305 B1 | 10/2009 | Rault |
| 7,630,522 B2 | 12/2009 | Popp et al. |
| 7,715,597 B2 | 5/2010 | Costache et al. |
| 7,738,550 B2 | 6/2010 | Kuhn |
| 7,788,191 B2 | 8/2010 | Jebara |
| 7,869,518 B2 * | 1/2011 | Kim .............. H04N 21/234309 348/699 |
| 8,019,170 B2 | 9/2011 | Wang |
| 8,036,464 B2 | 10/2011 | Sridhar et al. |
| 8,065,302 B2 | 11/2011 | Sridhar et al. |
| 8,068,677 B2 | 11/2011 | Varadarajan et al. |
| 8,086,692 B2 | 12/2011 | Sridhar et al. |
| 8,090,670 B2 | 1/2012 | Sridhar et al. |
| 8,135,062 B1 | 3/2012 | Cote |
| 8,140,550 B2 | 3/2012 | Varadarajan et al. |
| 8,149,915 B1 * | 4/2012 | Novotny .............. H04N 19/56 375/240.16 |
| 8,243,118 B2 | 8/2012 | Pace |
| 8,259,794 B2 | 9/2012 | Bronstein et al. |
| 8,290,038 B1 | 10/2012 | Wang et al. |
| 8,290,049 B2 * | 10/2012 | Kondo .............. H04N 19/105 348/699 |
| 8,379,712 B2 * | 2/2013 | Park .............. H04N 19/52 348/355 |
| 8,737,464 B1 | 5/2014 | Zhang et al. |
| 8,902,971 B2 | 12/2014 | Pace et al. |
| 8,908,766 B2 | 12/2014 | Pace |
| 8,942,283 B2 | 1/2015 | Pace |
| 8,964,835 B2 | 2/2015 | Pace |
| 9,106,977 B2 | 8/2015 | Pace |
| 9,532,069 B2 | 12/2016 | Pace et al. |
| 9,578,345 B2 | 2/2017 | DeForest et al. |
| 2001/0038714 A1 | 11/2001 | Masumoto et al. |
| 2002/0016873 A1 | 2/2002 | Gray et al. |
| 2002/0025001 A1 | 2/2002 | Ismaeil et al. |
| 2002/0054047 A1 | 5/2002 | Toyama et al. |
| 2002/0059643 A1 | 5/2002 | Kitamura et al. |
| 2002/0073109 A1 | 6/2002 | Toriumi |
| 2002/0085633 A1 | 7/2002 | Kim et al. |
| 2002/0114392 A1 | 8/2002 | Sekiguchi et al. |
| 2002/0116529 A1 | 8/2002 | Hayden |
| 2002/0164068 A1 | 11/2002 | Yan |
| 2002/0196328 A1 | 12/2002 | Piotrowski |
| 2003/0011589 A1 | 1/2003 | Desbrun et al. |
| 2003/0058943 A1 | 3/2003 | Zakhor et al. |
| 2003/0063778 A1 | 4/2003 | Rowe et al. |

(56) References Cited

U.S. PATENT DOCUMENTS

| | | |
|---|---|---|
| 2003/0103647 A1 | 6/2003 | Rui et al. |
| 2003/0112243 A1 | 6/2003 | Garg et al. |
| 2003/0122966 A1 | 7/2003 | Markman et al. |
| 2003/0163690 A1 | 8/2003 | Stewart |
| 2003/0169812 A1 | 9/2003 | Maziere et al. |
| 2003/0194134 A1 | 10/2003 | Wenzel et al. |
| 2003/0195977 A1 | 10/2003 | Liu et al. |
| 2003/0206589 A1 | 11/2003 | Jeon |
| 2003/0231769 A1 | 12/2003 | Bolle et al. |
| 2003/0235341 A1 | 12/2003 | Gokturk et al. |
| 2004/0013286 A1 | 1/2004 | Viola et al. |
| 2004/0017852 A1 | 1/2004 | Garrido et al. |
| 2004/0022320 A1 | 2/2004 | Kawada et al. |
| 2004/0028139 A1 | 2/2004 | Zaccarin et al. |
| 2004/0037357 A1 | 2/2004 | Bagni et al. |
| 2004/0081359 A1 | 4/2004 | Bascle et al. |
| 2004/0085315 A1 | 5/2004 | Duan et al. |
| 2004/0091048 A1* | 5/2004 | Youn ............ H04N 19/56 375/240.16 |
| 2004/0107079 A1 | 6/2004 | MacAuslan |
| 2004/0113933 A1 | 6/2004 | Guier |
| 2004/0135788 A1 | 7/2004 | Davidson et al. |
| 2004/0246336 A1 | 12/2004 | Kelly, III et al. |
| 2004/0264574 A1 | 12/2004 | Lainema |
| 2005/0015259 A1 | 1/2005 | Thumpudi et al. |
| 2005/0128306 A1 | 6/2005 | Porter et al. |
| 2005/0185823 A1 | 8/2005 | Brown et al. |
| 2005/0193311 A1 | 9/2005 | Das et al. |
| 2005/0281335 A1* | 12/2005 | Ha ............ H04N 19/56 375/240.16 |
| 2006/0013450 A1 | 1/2006 | Shan et al. |
| 2006/0029253 A1 | 2/2006 | Pace |
| 2006/0045185 A1 | 3/2006 | Kiryati |
| 2006/0067585 A1 | 3/2006 | Pace |
| 2006/0120571 A1 | 6/2006 | Tu et al. |
| 2006/0120613 A1 | 6/2006 | Su et al. |
| 2006/0133681 A1 | 6/2006 | Pace |
| 2006/0177140 A1 | 8/2006 | Pace |
| 2006/0204115 A1 | 9/2006 | Burazerovic |
| 2006/0233448 A1 | 10/2006 | Pace et al. |
| 2006/0274949 A1 | 12/2006 | Gallagher et al. |
| 2007/0025373 A1 | 2/2007 | Stewart |
| 2007/0053513 A1 | 3/2007 | Hoffberg |
| 2007/0071100 A1 | 3/2007 | Shi et al. |
| 2007/0071336 A1 | 3/2007 | Pace |
| 2007/0153025 A1 | 7/2007 | Mitchell et al. |
| 2007/0183661 A1 | 8/2007 | El-Maleh et al. |
| 2007/0185946 A1 | 8/2007 | Basri et al. |
| 2007/0239778 A1 | 10/2007 | Gallagher |
| 2007/0268964 A1 | 11/2007 | Zhao |
| 2007/0297645 A1 | 12/2007 | Pace et al. |
| 2008/0027917 A1 | 1/2008 | Mukherjee et al. |
| 2008/0040375 A1 | 2/2008 | Vo et al. |
| 2008/0043848 A1 | 2/2008 | Kuhn |
| 2008/0101652 A1 | 5/2008 | Zhao et al. |
| 2008/0117977 A1* | 5/2008 | Lee ............ H04N 19/56 375/240.16 |
| 2008/0152008 A1 | 6/2008 | Sun et al. |
| 2008/0232477 A1 | 9/2008 | Wang et al. |
| 2008/0240247 A1 | 10/2008 | Lee et al. |
| 2009/0040367 A1 | 2/2009 | Zakrzewski et al. |
| 2009/0055417 A1 | 2/2009 | Hannuksela |
| 2009/0067719 A1 | 3/2009 | Sridhar et al. |
| 2009/0080855 A1 | 3/2009 | Senftner et al. |
| 2009/0112905 A1 | 4/2009 | Mukerjee et al. |
| 2009/0129474 A1 | 5/2009 | Pandit et al. |
| 2009/0158370 A1 | 6/2009 | Li et al. |
| 2009/0168884 A1* | 7/2009 | Lu ............ H04N 19/56 375/240.16 |
| 2009/0175538 A1 | 7/2009 | Bronstein et al. |
| 2009/0262804 A1 | 10/2009 | Pandit et al. |
| 2009/0292644 A1 | 11/2009 | Varadarajan et al. |
| 2010/0008424 A1 | 1/2010 | Pace |
| 2010/0027861 A1 | 2/2010 | Shekhar et al. |
| 2010/0049739 A1 | 2/2010 | Varadarajan et al. |
| 2010/0073458 A1 | 3/2010 | Pace |
| 2010/0074600 A1 | 3/2010 | Putterman et al. |
| 2010/0086062 A1 | 4/2010 | Pace |
| 2010/0088717 A1 | 4/2010 | Candelore et al. |
| 2010/0135575 A1 | 6/2010 | Guo et al. |
| 2010/0135590 A1 | 6/2010 | Yang et al. |
| 2010/0167709 A1 | 7/2010 | Varadarajan et al. |
| 2010/0271484 A1* | 10/2010 | Fishwick ............ G06T 7/2026 348/169 |
| 2010/0272185 A1 | 10/2010 | Gao et al. |
| 2010/0278275 A1 | 11/2010 | Yang et al. |
| 2010/0290524 A1 | 11/2010 | Lu et al. |
| 2010/0316131 A1 | 12/2010 | Shanableh et al. |
| 2010/0322300 A1 | 12/2010 | Li et al. |
| 2010/0322309 A1 | 12/2010 | Huang et al. |
| 2011/0019026 A1 | 1/2011 | Kameyama |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1 | 7/2011 | Pace |
| 2011/0221865 A1 | 9/2011 | Hyndman |
| 2011/0285708 A1 | 11/2011 | Chen et al. |
| 2011/0286627 A1 | 11/2011 | Takacs et al. |
| 2012/0044226 A1 | 2/2012 | Singh et al. |
| 2012/0079004 A1 | 3/2012 | Herman |
| 2012/0105654 A1 | 5/2012 | Kwatra et al. |
| 2012/0155536 A1 | 6/2012 | Pace |
| 2012/0163446 A1 | 6/2012 | Pace |
| 2012/0281063 A1 | 11/2012 | Pace |
| 2013/0027568 A1 | 1/2013 | Zou et al. |
| 2013/0035979 A1 | 2/2013 | Tenbrock |
| 2013/0083854 A1 | 4/2013 | Pace |
| 2013/0107948 A1 | 5/2013 | DeForest et al. |
| 2013/0114703 A1 | 5/2013 | DeForest et al. |
| 2013/0170541 A1 | 7/2013 | Pace et al. |
| 2013/0230099 A1 | 9/2013 | DeForest et al. |
| 2014/0286433 A1* | 9/2014 | He ............ H04N 19/00696 375/240.16 |
| 2014/0355687 A1* | 12/2014 | Takehara ............ H04N 19/105 375/240.16 |
| 2015/0124874 A1 | 5/2015 | Pace |
| 2015/0189318 A1 | 7/2015 | Pace |
| 2016/0073111 A1 | 3/2016 | Lee et al. |

FOREIGN PATENT DOCUMENTS

| | | |
|---|---|---|
| EP | 1 250 012 | 10/2002 |
| EP | 1 426 898 A2 | 6/2004 |
| EP | 1 779 294 A2 | 5/2007 |
| JP | H03253190 A | 11/1991 |
| JP | H05244585 A | 9/1993 |
| JP | 07-038873 | 2/1995 |
| JP | H0795587 A | 4/1995 |
| JP | 07-288789 | 10/1995 |
| JP | 08-235383 | 9/1996 |
| JP | 08-263623 | 10/1996 |
| JP | 2000-20955 A | 7/2000 |
| JP | 2001-100731 A | 4/2001 |
| JP | 2001-103493 A | 4/2001 |
| JP | 2002-525735 T | 8/2002 |
| JP | 2004-94917 A | 3/2004 |
| JP | 2004 356747 | 12/2004 |
| JP | 2006-521048 A | 9/2006 |
| JP | 2007-504696 A | 3/2007 |
| JP | 2009-501479 A | 1/2009 |
| JP | 2010-517426 A | 5/2010 |
| TW | 200521885 | 7/2005 |
| TW | 200527327 | 8/2005 |
| TW | 200820782 | 5/2008 |
| WO | WO 98/27515 | 6/1998 |
| WO | WO 98/59497 A1 | 12/1998 |
| WO | WO 99/26415 | 5/1999 |
| WO | WO 00/16563 | 3/2000 |
| WO | WO 00/45600 | 8/2000 |
| WO | WO 02/102084 A1 | 12/2002 |
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |

(56) References Cited

FOREIGN PATENT DOCUMENTS

| WO | WO 2006/034308 A2 | 3/2006 |
|---|---|---|
| WO | WO 2006/055512 A2 | 5/2006 |
| WO | WO 2006/083567 A1 | 8/2006 |
| WO | WO 2006/105470 A1 | 10/2006 |
| WO | WO 2007/007257 A1 | 1/2007 |
| WO | WO 2007/146102 A2 | 12/2007 |
| WO | WO 2008/091483 A2 | 7/2008 |
| WO | WO 2008/091484 A2 | 7/2008 |
| WO | WO 2008/091485 A2 | 7/2008 |
| WO | WO 2010/042486 A1 | 4/2010 |
| WO | WO 2010/118254 | 10/2010 |
| WO | WO 2011/156250 A1 | 12/2011 |
| WO | WO 2012/033970 A1 | 3/2012 |
| WO | WO 2013/148002 A2 | 10/2013 |
| WO | WO 2013/148091 A1 | 10/2013 |
| WO | WO 2014/051712 A1 | 4/2014 |
| WO | WO 2015/138008 A1 | 9/2015 |
| WO | WO 2016/040116 A1 | 3/2016 |

OTHER PUBLICATIONS

Amit, Yali, *2D Object Detection and Recognition: Models, Algorithms, and Networks*, The MIT Press, Cambridge, Massachusetts, pp. 147-149 (Sections 7.3: Detecting Pose and 7.4: Bibliographical Notes and Discussion) (2002).
Antoszczyszyn, P.M., et al., "Tracking of the Motion of Important Facial Features in Model-Based Coding," *Signal Processing*, 66(2):249-260, (Apr. 30, 1998).
Bay, H., et al., "SURF: Speeded Up Robust Features", ETH Zurich {bay, vangool}@vision.ee.ethz.ch, 1-14 (Date Not Provided).
"Bit-Torrent: Introduction", Retrieved on: Jan. 18, 2006, retrieved online at: http://web.archive.org/web/20060118042451/http://www.bittorrent.com/introduction.html.
Brenneman, A., et al., "x264", Wikipedia—The Free Encyclopedia: http://en.wikipedia,org/wiki/X264, 1-5 (Date Not Provided).
Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).
Dodgson, N. A., "Image resampling," Technical Report, UCAM-CL-TR-261, ISSN 1476-2986, University of Cambridge, Computer Laboratory, (264 pp.) (Aug. 1992).
Doenges, P. K., "MPEG-4: Audio/Video and Synthetic Graphics/Audio for Mixed Media," *Signal Processing: Image Communication*, No. 9, pp. 433-463 (1997).
Ebrahimi, T., et al. "MPEG-4 natural video coding—An Overview", Signal Processing: Image Communication 15:365-385 (2000).
Extended European Search Report for 06 73 3758.4, dated Mar. 8, 2011 (17 pages).
Extended European Search Report for 06 74 0318.8, dated May 6, 2011 (14 pages).
Fischler, M.A., et al., "Random Sample Consensus: A Paradigm for Model Fitting with Applications to Image Analysis and Automated Cartography," Communications of the Association for Computing Machinery, 24(6):381-395 (1981).
Fukuhara, T., et al., "3-D Motion Estimation of Human Head for Model-Based Image Coding," *IEEE Proceedings-I*, 140(1):26-35, (Feb. 1, 1993).
Garrett-Glaser, J., "Diary of an x264 Developer", http://x264dev.multimedia.cx/, 1-7 (2008).
Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).
Gunsel, B. et al., "Content based access to video objects: Temporal segmentation, visual summarization, and feature extraction," *Signal Processing*, vol. 66, pp. 261 280 (1998).
"H.264/MPEG-4 AVC", Wikipedia—The Free Encyclopedia: http://en.wikipedia,org/wiki/X264, 1-17 (Date Not Provided).

Harris, C., et al., "A Combined Corner nad Edge Detector," Alvey Vision Conference, Proceedings of the Alvey Vision Conference, p. 147 (1988).
Huang, R. et al., "Sparse representation of images with hybrid linear models," in *Proc. ICIP '04*, 2(1281 1284) Oct. 2004.
Huang, T.S. et al., "Chapter 5: Three-Dimensional Model-Based Image Communication," *Visual Information Representation, Communication, and Image Processing*, Editors: Chen, Chang Wen, et al., Marcel Dekker, Inc., New York, New York, pp. 97-117 (1999).
Intel Integrated Performance Primitives—Documentation, http://software.intel.com/en-us-articles/intel-integrated-performance-primitives-documentation/ (Retrieved on Dec. 21, 2012).
International Search Report for International Application No. PCT/US2009/059653, 8 pp., mailed Feb. 2, 2010.
Invitation to Pay Additional Fees and, Where Applicable, Protest Fee, for International Application No. PCT/US2008/000090, mailed Jun. 2, 2010.
Irani, M., et al., "Detecting and Tracking Multiple Moving Objects Using Temporal Integration," European Conference on Computer Vision, 282-287 (1992).
Jolliffe, I.T., "Principal Component Analysis, Second Edition," Springer, 518 pp., Apr. 2002.
Jones, M. and P. Viola, "Fast Multi View Face Detection," *Mitsubishi Electrical Laboratories*, Jul. 2003 (10 pp.).
Kass, Michael, Andrew Witzin, and Demetri Terzopoulos, "Snakes: Active contour Models," *International Journal of Computer Vision* (1988).
Keysers, et al., "Deformation Models for Image Recognition," IEEE Transactions on Pattern Analysis and Machine Intelligence, 29(8):1422-1435 (2007).
Lowe, D.G., "Distinctive Image Features from Scale-Invariant Keypoints", International Journal of Computer Vision, 1-28 (2004).
Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).
Neff, et al., "Matching-Pursuit Based Video Compression", *Department of Electrical Engineering and Computer Science*, MPEG Meeting, Mar. 11, 1995.
Notification and Transmittal of International Search Report and Written Opinion dated Jun. 10, 2013 for PCT/US2013/029297, entitled "Video Compression Repository and Model Reuse".
Notification Concerning Transmittal of International Preliminary Report on Patentability, PCT/US2013/025123, "Video Compression Repository and Model Reuse," date of mailing Oct. 1, 2014.
Notification Concerning Transmittal of International Preliminary Report on Patentability, PCT/US2013/025123, "Context Based Video Encoding and Decoding," date of mailing Oct. 9, 2014.
Notification Concerning Transmittal of International Preliminary Report on Patentability, in International Application No. PCT/US2008/000092, pp. 9, mailed Aug. 6, 2009.
Notification Concerning Transmittal of International Preliminary Report on Patentability, in International Application No. PCT/US2008/000091, pp. 9, mailed Aug. 6, 2009.
Notification Concerning Transmittal of International Preliminary Report on Patentability (Chapter I of the Patent Cooperation Treaty), for International Application No. PCT/US2008/00090, mailed Sep. 2, 2010.
Notification Concerning Transmittal of the International Preliminary Report on Patentability for PCT/US2009/059653, mailed Apr. 21, 2011 (10 pages).
Notification of Transmittal of the International Search Report and the Written Opinion of the International Searching Authority, or the Declaration, for International Application No. PCT/US2008/000090, 19 pp., mailed Aug. 18, 2010.
OpenCV Documentation Page, http://docs.openev.org/ (Retrieved on Dec. 21, 2012).
Osama, et al., "Video Compression Using Matching Pursuits", *IEEE Transactions on Circuits and Systems for Video Technology*, vol. 9, No. 1, Feb. 1999.

(56) References Cited

OTHER PUBLICATIONS

Park, et al., "Qualitative Estimation of Camera Motion Parameters From the Linear Composition of Optical Flow," Pattern Recognition: The Journal of the Pattern Recognition Society, 37:767-779 (2004).
Pati, Y.C., et al., "Orthogonal Matching Pursuit: Recursive Function Approximation with Applications to Wavelet Decomposition", 27th Annual Asilomar conference on Signals systems and Computers ,1-5 (1993).
PCT International Search Report, for International Application No. PCT/US2008/000091, dated Sep. 23, 2008, 5 pages.
PCT International Search Report, for International Application No. PCT/US2008/000092, dated Sep. 23, 2008, 5 pages.
Piamsa nga, P. and N. Babaguchi, "Motion estimation and detection of complex object by analyzing resampled movements of parts," in *Proc. ICIP '04*, 1 (365 368), Oct. 2004.
Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).
Rehg, J. M. and Witkin, A. P., "Visual Tracking with Deformation Models," *Proc. IEEE Int'l. Conf. on Robotics and Automation*, pp. 844-850 (Apr. 1991).
Reinders, M.J.T., et al., "Facial Feature Localization and Adaptation of a Generic Face Model for model-Based Coding," *Signal Processing: Image Communication*, No. 7, pp. 57-74 (1995).
Richardson, I., "Vcodex White Paper: Video Compression Patents," Vcodex Ltd., pp. 3-6 (2008-2011).
Rong, S. et al., "Efficient spatiotemporal segmentation and video object generation for highway surveillance video," in *Proc. IEEE Int'l, Conf. Communications, Circuits and Systems and West Sino Expositions*, 1(580 584), Jun. Jul. 2002.
Schröder, K., et al., "Combined Description of Shape and Motion in an Object Based Coding Scheme Using Curved Triangles," Proceedings of the International Conference on Image Processing, 2:390-393 (1995).
"Series H: Audiovisual and Multimedia Systems: Infrastructure of audiovisual services—Coding of moving video; Advanced video coding for generic audiovisual services", ITU-T, H.264: 1-657 (2012).
Shin, J. et al., "Optical flow-based real-time object tracking using non-prior training active feature model," Academic Press Limited, GB, vol. 11, No. 3, pp. 204-218 (Jun. 1, 2005).
Tabatabai, A. J., et al., "Motion Estimation Methods for Video Compression—A Review," Journal of the Franklin Institute, 335(8): 1411-1441 (1998).
Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).
Toklu, C. et al., "Simultaneous Alpha Map Generation and 2 D Mesh Tracking for Multimedia Applications," *Proceedings of the International Conference on Image Processing: 1997*, (113 116) (Oct. 1997).
Urban, M., "Harris Interest Operator," Jan. 28, 2003, http://cmp.felk.cvut.cz/cmp/courses/dzo/resources/lecture_harris_urban.pdf (23 pp.).
Vidal, R. and R. Hartley, "Motion segmentation with missing data using PowerFactorization and GPCA," in *Proc. CVPR 04*, 2 (II-310-316), Jun.-Jul. 2004.
Vidal, R. et al., "Generalized principal component analysis (GPCA)", in *Proc. CVPR '03*, 1 (I621-628), Jun. 2003.
Viola, P. and Jones, M.J., "Robust Real-Time Face Detection," International Journal of Computer Vision, 57(2):137-154 (2004).
Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511 518.
Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).
Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).
Wiegand, T., et al., "Overview of the H.264/AVC Video Coding Standard", IEEE Transactions on Circuits and Systems for Video Technology, 13(7):560-576 (2003).
Written Opinion of the International Searching Authority for International Application No. PCT/US2009/059653, 8 pp., mailed Feb. 2, 2010.
Zhang, et al., "A Novel Video Coding Framework by Perceptual Representation and Macroblock-Based Matching Pursuit Algorithm", *Department of Computer Science and Technology*, pp. 322-331 (2007).
Braspenning, R., et al., "True-Motion Estimation using Features Correspondences," *Visual Communications and Image Processing*, SPIE vol. 5308, (2004).
Chen, M., et al., "Efficient Multi-Frame Motion Estimation Algorithms for MPEG-4 AVC/JVT/H.264," *IEEE International Symposium on Circuits and Systems*, pp. III-737 (May 2004).
Lee, T., et al., "A New Motion Vector Composition Algorithm for H.264 Multiple Reference Frame Motion Estimation," retrieved from the Internet on Jan. 16, 2015: http://eprints.lib.hokudai.ac.jp/dspace/bitstream/2115/39749/1/TA-P2-7.
Smith, L., et al., "A tutorial on Principal Components Analysis," Feb. 26, 2002.
Su, Y., et al., "Fast Multiple Reference Frame Motion Estimation for H.264/AVC," *IEEE Transactions on Circuits and Systems for Video Technology, IEE Service Center*, vol. 16(3), pp. 447-452 (Mar. 2006).
Wikipedia, Motion Perception; 6 pages; downloaded on Aug. 24, 2015; See https://en.wikipedia.org/wiki/Motion_perception#The_aperture_problem.
Notification of Transmittal of The International Search Report and The Written Opinion of the International Searching Authority, or the Declaration, for International Application No. PCT/US2014/063913, "Continuous Block Tracking for Temporal Prediction in Video Encoding," 11 pages, mailed May 27, 2015.
Bulla, C. et al., "High Quality Video Conferencing: Region of Interest Encoding and Joint Video/Audio Analysis," International Journal on Advances in Telecommunications, 6(3-4): 153-163 (Dec. 2013).
Chen, Z. et al., "Perception-oriented video coding based on foveated JND model A," Picture Coding Symposium 2009, Section 2 (May 2009).
Li, Z., et al., "Visual attention guided bit allocation in video compression," *Image and Vision Computing*, 29(1): 1-14 (Jan. 2011).
Naccari, M. et al., "Improving HEVC Compression Efficiency by Intensity Dependant Spatial Quantisation," MPEG Meeting (Jul. 2012).
Richardson, Iain E., *The H.264 Advanced Video Compression Standard*, 2nd Edition, Chapter 7: H.264 Transform and Coding, Apr. 20, 2010.
Tang, C-W., "Spatiotemporal Visual Considerations for Video Coding," IEEE Transactions on Multimedia, 9(2): 231-238 (Feb. 2007).
Wikipedia, "Lumi masking," Retrieved from the Internet: https://web.archive.org/web/20061124153834/http://en.wikipedia.org/wiki/Lumi_masking, Retrieved on: Nov. 8, 2006, 1 page.

\* cited by examiner

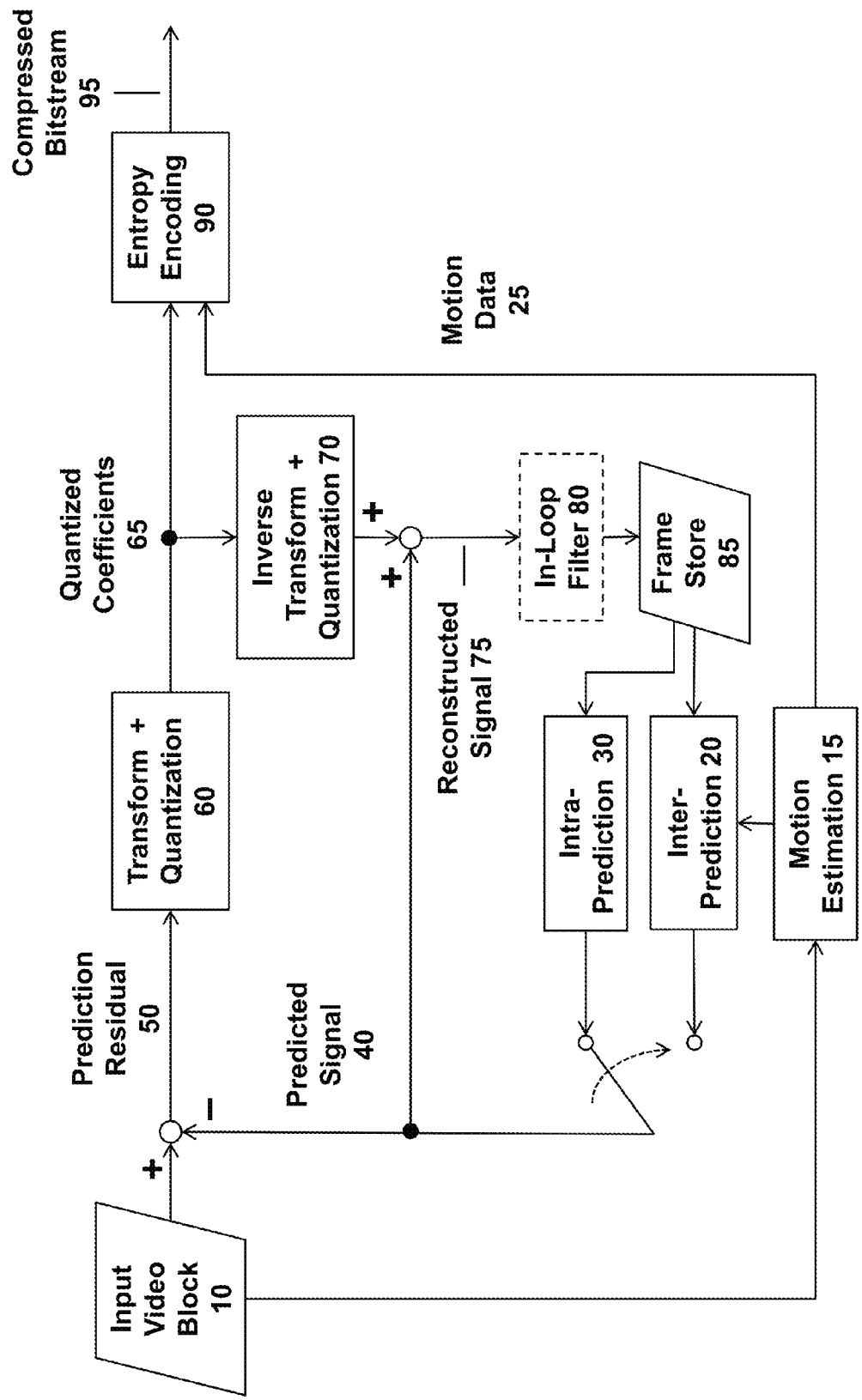
Figure 1: Basic encoder configuration

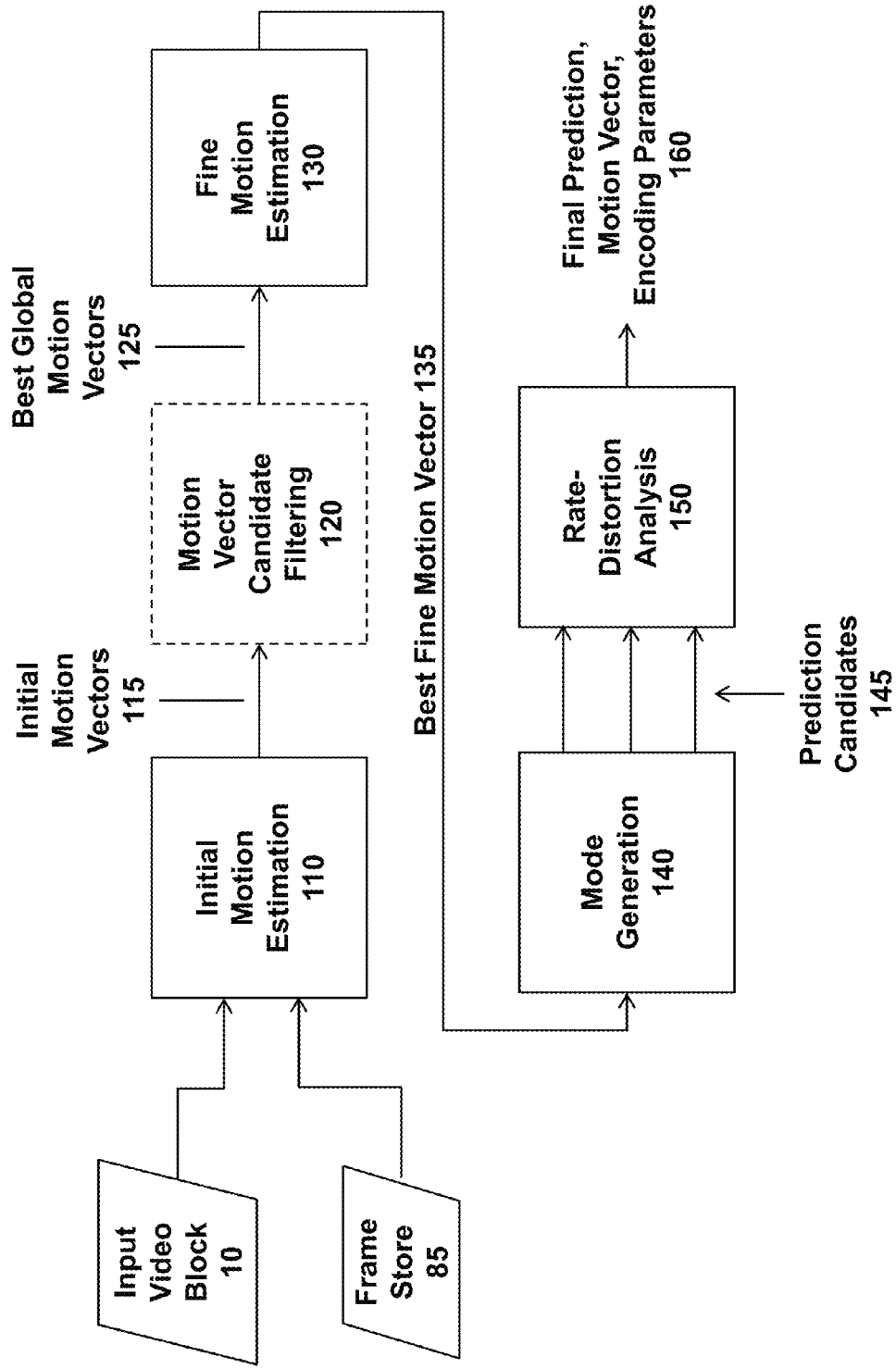
Figure 2: Inter-prediction steps

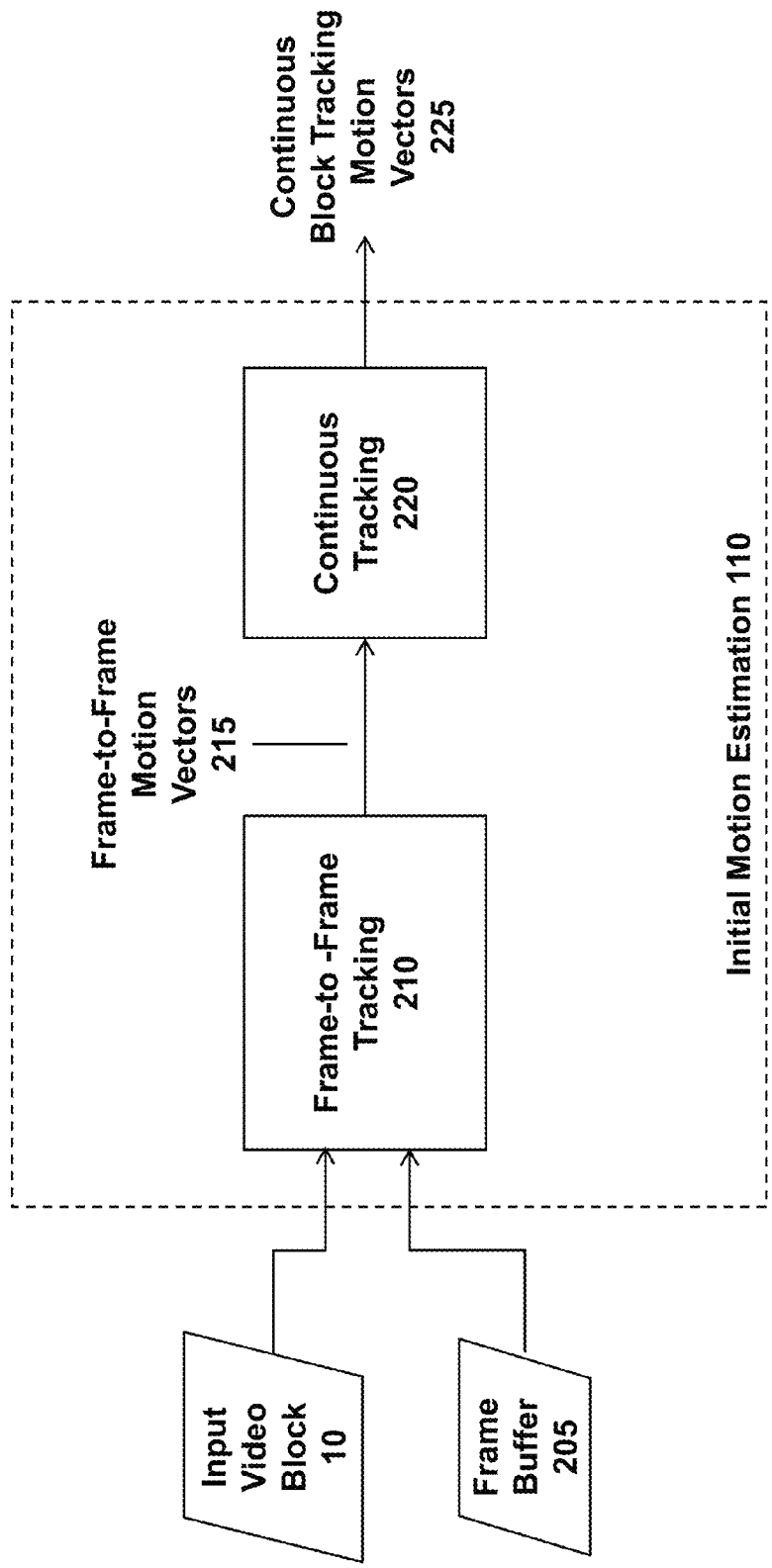
Figure 3: Initial motion estimation via continuous block tracking

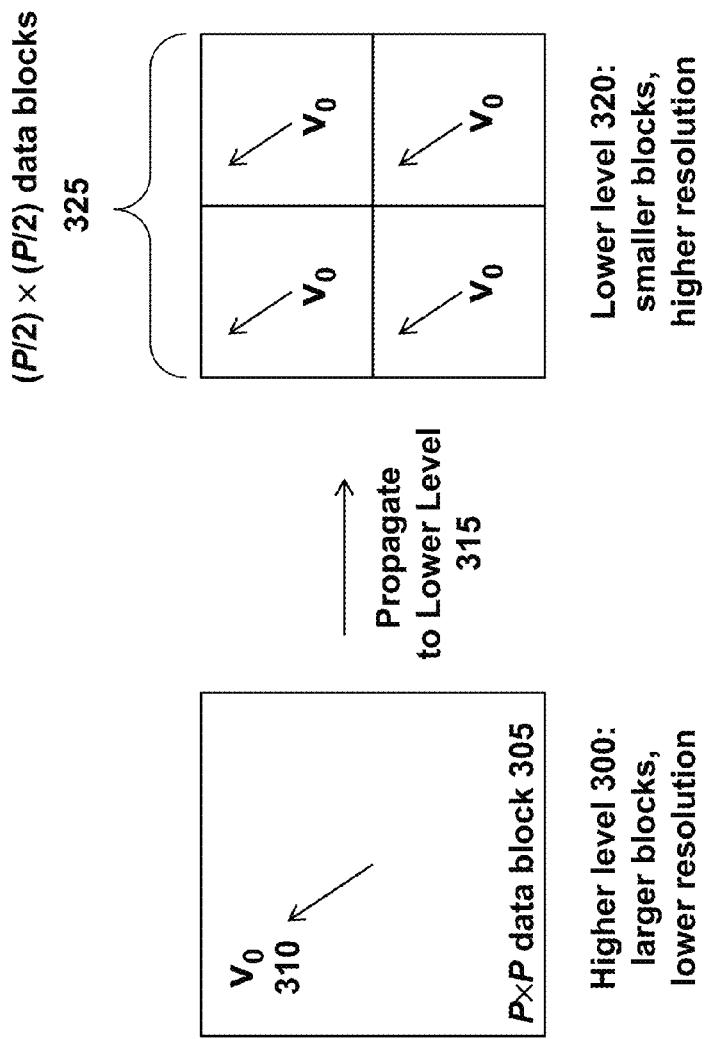
Figure 4: Hierarchical motion estimation motion vectors

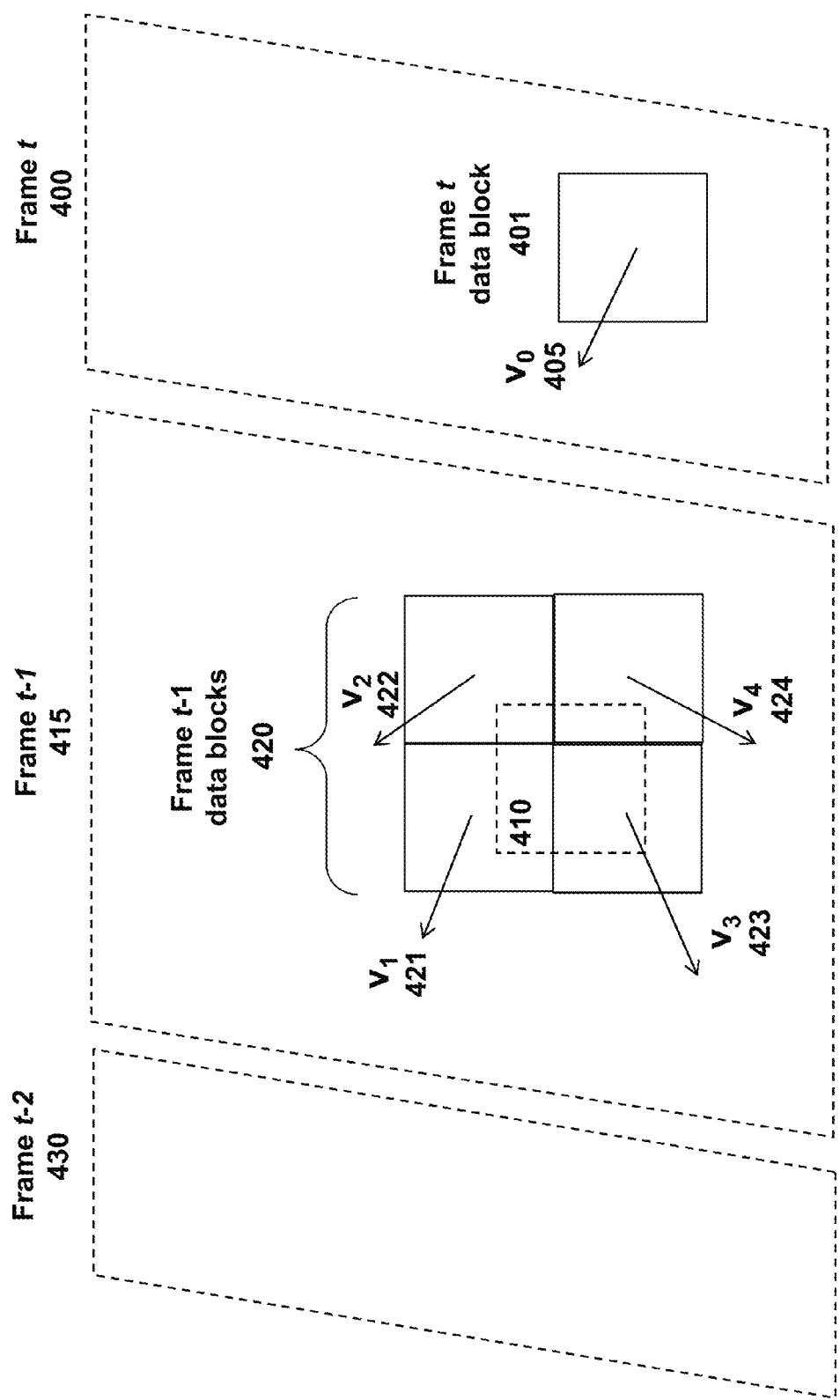
Figure 5: Calculating continuous tracking motion vectors from frame-to-frame motion vectors. Frame sizes are not drawn to scale (all frames are the same size).

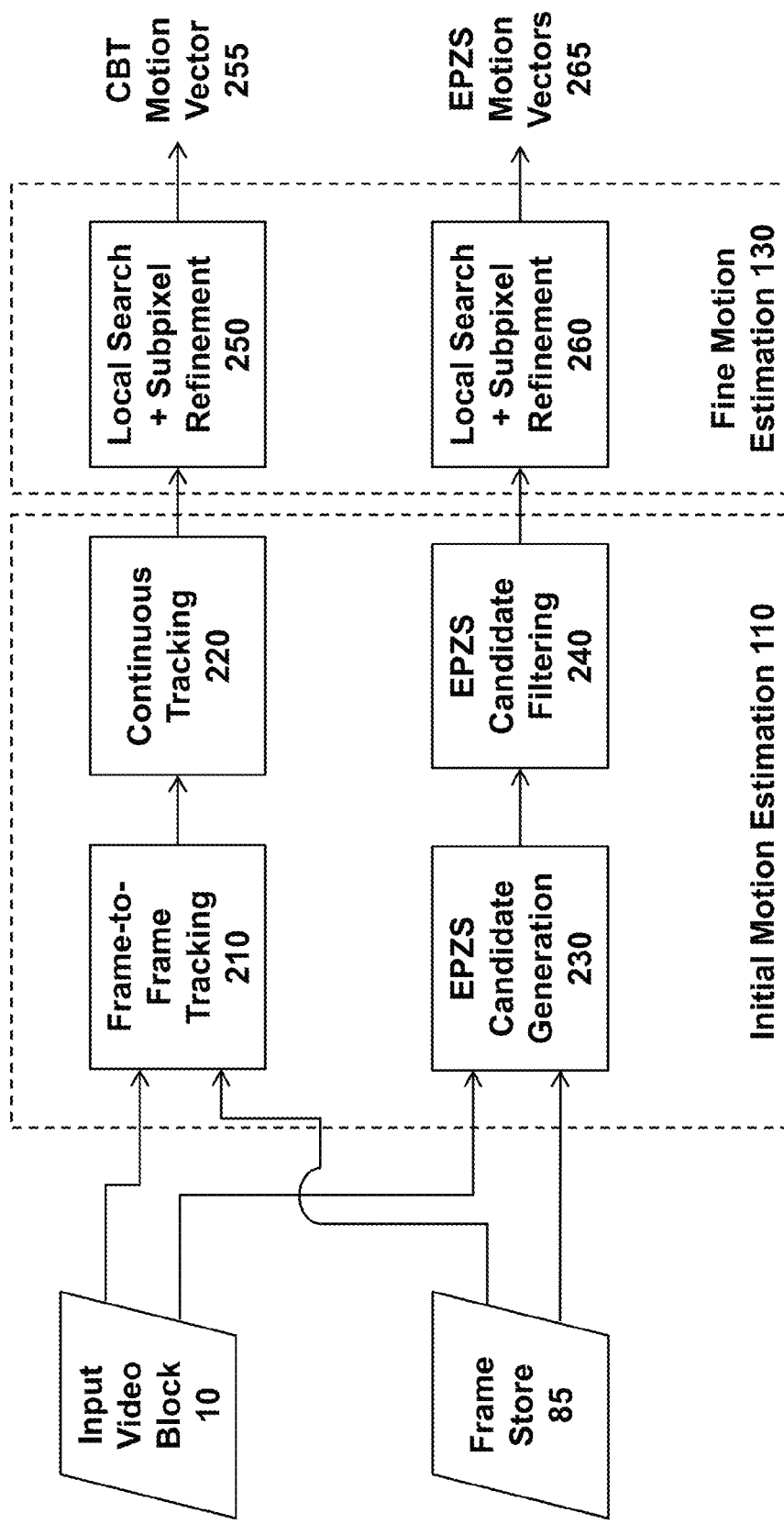
Figure 6: Unified motion estimation via combination of continuous block tracking (CBT) and enhanced predictive zonal search (EPZS)

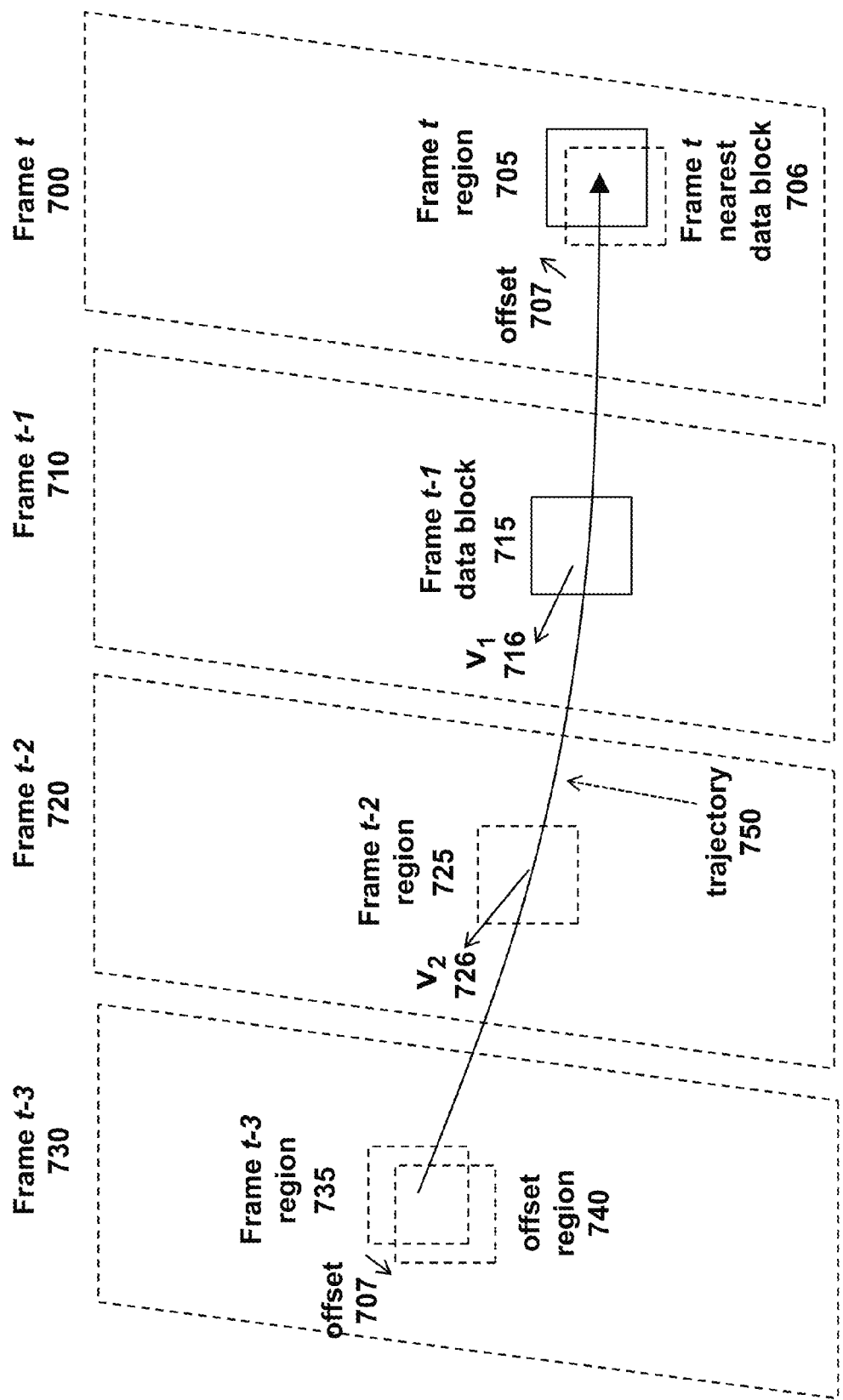
Figure 7: Use of continuous block tracking trajectories to track into current frame. Frame sizes are not drawn to scale (all frames much bigger than data blocks).

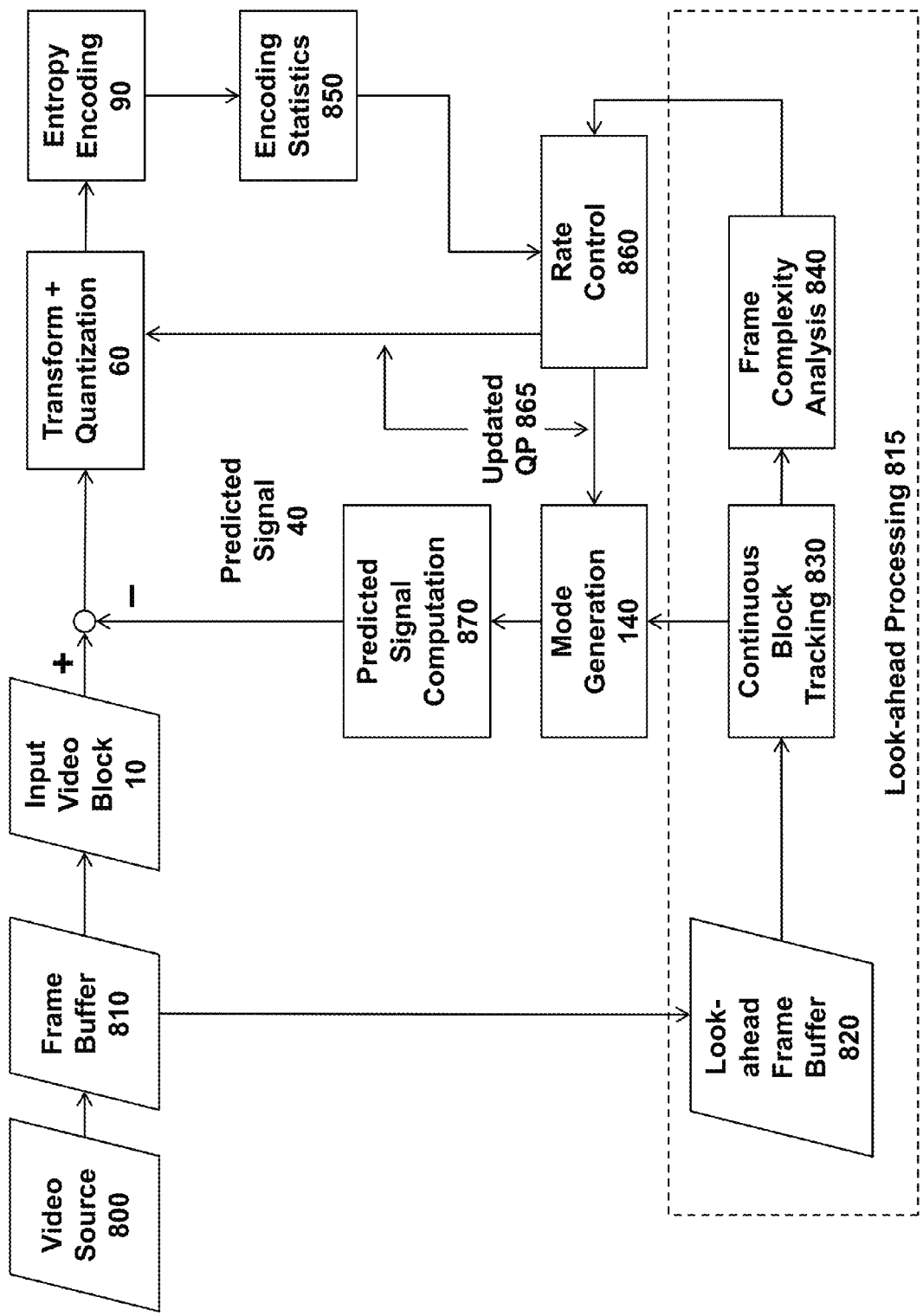
Figure 8: Look-ahead processing for rate control

CONTINUOUS BLOCK TRACKING FOR TEMPORAL PREDICTION IN VIDEO ENCODING

RELATED APPLICATIONS

This application claims the benefit of U.S. Provisional Application No. 61/950,784, filed Mar. 10, 2014 and U.S. Provisional Application No. 62/049,342, filed Sep. 11, 2014. This application is related to U.S. application Ser. No. 13/797,644 filed on Mar. 12, 2013, which is a continuation-in-part of U.S. application Ser. No. 13/725,940 filed on Dec. 21, 2012, which claims the benefit of U.S. Provisional Application No. 61/615,795 filed on Mar. 26, 2012 and U.S. Provisional Application No. 61/707,650 filed on Sep. 28, 2012. This application is also related to U.S. patent application Ser. No. 13/121,904, internationally filed on Oct. 6, 2009, which is a U.S. National Stage of PCT/US2009/059653 filed Oct. 6, 2009, which claims the benefit of U.S. Provisional Application No. 61/103,362, filed Oct. 7, 2008. The '904 application is also a continuation-in part of U.S. patent application Ser. No. 12/522,322, internationally filed on Jan. 4, 2008, which claims the benefit of U.S. Provisional Application No. 60/881,966, filed Jan. 23, 2007, is related to U.S. Provisional Application No. 60/811,890, filed Jun. 8, 2006, and is a continuation-in-part of U.S. application Ser. No. 11/396,010, filed Mar. 31, 2006, now U.S. Pat. No. 7,457,472, which is a continuation-in-part of U.S. application Ser. No. 11/336,366 filed Jan. 20, 2006, now U.S. Pat. No. 7,436,981, which is a continuation-in-part of U.S. application Ser. No. 11/280,625 filed Nov. 16, 2005, now U.S. Pat. No. 7,457,435, which is a continuation-in-part of U.S. application Ser. No. 11/230,686 filed Sep. 20, 2005, now U.S. Pat. No. 7,426,285, which is a continuation-in-part of U.S. application Ser. No. 11/191,562 filed Jul. 28, 2005, now U.S. Pat. No. 7,158,680. U.S. application Ser. No. 11/396,010 also claims the benefit of U.S. Provisional Application No. 60/667,532, filed Mar. 31, 2005 and U.S. Provisional Application No. 60/670,951, filed Apr. 13, 2005.

This present application is also related to U.S. Provisional Application No. 61/616,334, filed Mar. 27, 2012, U.S. Provisional Application No. 61/650,363 filed May 22, 2012 and U.S. application Ser. No. 13/772,230 filed Feb. 20, 2013, which claims the benefit of the '334 and '363 Provisional Applications.

The entire teachings of the above application(s) are incorporated herein by reference.

BACKGROUND

Video compression can be considered the process of representing digital video data in a form that uses fewer bits when stored or transmitted. Video compression algorithms can achieve compression by exploiting redundancies in the video data, whether spatial, temporal, or color-space. Video compression algorithms typically segment the video data into portions, such as groups of frames and groups of pels, to identify areas of redundancy within the video that can be represented with fewer bits than required by the original video data. When these redundancies in the data are exploited, greater compression can be achieved. An encoder can be used to transform the video data into an encoded format, while a decoder can be used to transform encoded video back into a form comparable to the original video data. The implementation of the encoder/decoder is referred to as a codec.

Standard encoders divide a given video frame into non-overlapping coding units or macroblocks (rectangular regions of contiguous pels) for encoding. The macroblocks (herein referred to more generally as "input blocks" or "data blocks") are typically processed in a traversal order of left to right and top to bottom in a video frame. Compression can be achieved when input blocks are predicted and encoded using previously-coded data. The process of encoding input blocks using spatially neighboring samples of previously-coded blocks within the same frame is referred to as intra-prediction. Intra-prediction attempts to exploit spatial redundancies in the data. The encoding of input blocks using similar regions from previously-coded frames, found using a motion estimation algorithm, is referred to as inter-prediction. Inter-prediction attempts to exploit temporal redundancies in the data. The motion estimation algorithm can generate a motion vector that specifies, for example, the location of a matching region in a reference frame relative to an input block that is being encoded. Most motion estimation algorithms consist of two main steps: initial motion estimation, which provides an first, rough estimate of the motion vector (and corresponding temporal prediction) for a given input block, and fine motion estimation, which performs a local search in the neighborhood of the initial estimate to determine a more precise estimate of the motion vector (and corresponding prediction) for that input block.

The encoder may measure the difference between the data to be encoded and the prediction to generate a residual. The residual can provide the difference between a predicted block and the original input block. The predictions, motion vectors (for inter-prediction), residuals, and related data can be combined with other processes such as a spatial transform, a quantizer, an entropy encoder, and a loop filter to create an efficient encoding of the video data. The residual that has been quantized and transformed can be processed and added back to the prediction, assembled into a decoded frame, and stored in a framestore. Details of such encoding techniques for video will be familiar to a person skilled in the art.

MPEG-2 (H.262) and H.264 (MPEG-4 Part 10, Advanced Video Coding [AVC]), hereafter referred to as MPEG-2 and H.264, respectively, are two codec standards for video compression that achieve high quality video representation at relatively low bitrates. The basic coding units for MPEG-2 and H.264 are 16×16 macroblocks. H.264 is the most recent widely-accepted standard in video compression and is generally thought to be twice as efficient as MPEG-2 at compressing video data.

The basic MPEG standard defines three types of frames (or pictures), based on how the input blocks in the frame are encoded. An I-frame (intra-coded picture) is encoded using only data present in the frame itself. Generally, when the encoder receives video signal data, the encoder creates I-frames first and segments the video frame data into input blocks that are each encoded using intra-prediction. An I-frame consists of only intra-predicted blocks. I-frames can be costly to encode, as the encoding is done without the benefit of information from previously-decoded frames. A P-frame (predicted picture) is encoded via forward prediction, using data from previously-decoded I-frames or P-frames, also known as reference frames. P-frames can contain either intra blocks or (forward-)predicted blocks. A B-frame (bi-predicted picture) is encoded via bi-directional prediction, using data from both previous and subsequent frames. B-frames can contain intra, (forward-)predicted, or bi-predicted blocks.

A particular set of reference frames is termed a Group of Pictures (GOP). The GOP contains only the decoded pels within each reference frame and does not include information as to how the input blocks or frames themselves were originally encoded (I-frame, B-frame, or P-frame). Older video compression standards such as MPEG-2 use one reference frame (in the past) to predict P-frames and two reference frames (one past, one future) to predict B-frames. By contrast, more recent compression standards such as H.264 and HEVC (High Efficiency Video Coding) allow the use of multiple reference frames for P-frame and B-frame prediction. While reference frames are typically temporally adjacent to the current frame, the standards also allow reference frames that are not temporally adjacent.

Conventional inter-prediction is based on block-based motion estimation and compensation (BBMEC). The BBMEC process searches for the best match between the target block (the current input block being encoded) and same-sized regions within previously-decoded reference frames. When such a match is found, the encoder may transmit a motion vector. The motion vector may include a pointer to the best match's position in the reference frame. One could conceivably perform exhaustive searches in this manner throughout the video "datacube" (height×width× frame index) to find the best possible matches for each input block, but exhaustive search is usually computationally prohibitive and increases the chances of selecting particularly poor motion vectors. As a result, the BBMEC search process is limited, both temporally in terms of reference frames searched and spatially in terms of neighboring regions searched. This means that "best possible" matches are not always found, especially with rapidly changing data.

The simplest form of the BBMEC algorithm initializes the motion estimation using a (0, 0) motion vector, meaning that the initial estimate of a target block is the co-located block in the reference frame. Fine motion estimation is then performed by searching in a local neighborhood for the region that best matches (i.e., has lowest error in relation to) the target block. The local search may be performed by exhaustive query of the local neighborhood (termed here full block search) or by any one of several "fast search" methods, such as a diamond or hexagonal search.

An improvement on the BBMEC algorithm that has been present in standard codecs since later versions of MPEG-2 is the enhanced predictive zonal search (EPZS) algorithm [Tourapis, A., 2002, "Enhanced predictive zonal search for single and multiple frame motion estimation," Proc. SPIE 4671, Visual Communications and Image Processing, pp. 1069-1078]. The EPZS algorithm considers a set of motion vector candidates for the initial estimate of a target block, based on the motion vectors of neighboring blocks that have already been encoded, as well as the motion vectors of the co-located block (and neighbors) in the previous reference frame. The algorithm hypothesizes that the video's motion vector field has some spatial and temporal redundancy, so it is logical to initialize motion estimation for a target block with motion vectors of neighboring blocks, or with motion vectors from nearby blocks in already-encoded frames. Once the set of initial estimates has been gathered, the EPZS algorithm narrows the set via approximate rate-distortion analysis, after which fine motion estimation is performed.

Historically, model-based compression schemes have also been proposed to avoid the limitations of BBMEC prediction. These model-based compression schemes (the most well-known of which is perhaps the MPEG-4 Part 2 standard) rely on the detection and tracking of objects or features (defined generally as "components of interest") in the video and a method for encoding those features/objects separately from the rest of the video frame. These model-based compression schemes, however, suffer from the challenge of segmenting video frames into object vs. non-object (feature vs. non-feature) regions. First, because objects can be of arbitrary size, their shapes need to be encoded in addition to their texture (color content). Second, the tracking of multiple moving objects can be difficult, and inaccurate tracking causes incorrect segmentation, usually resulting in poor compression performance. A third challenge is that not all video content is composed of objects or features, so there needs to be a fallback encoding scheme when objects/ features are not present.

SUMMARY

The present invention recognizes fundamental limitations in the inter-prediction process of conventional codecs and applies higher-level modeling to overcome those limitations and provide improved inter-prediction, while maintaining the same general processing flow and framework as conventional encoders. Higher-level modeling provides an efficient way of navigating more of the prediction search space (the video datacube) to produce better predictions than can be found through conventional BBMEC and its variants. However, the modeling in the present invention does not require feature or object detection and tracking, so the model-based compression scheme presented herein does not encounter the challenges of segmentation that previous model-based compression schemes faced.

The present invention focuses on model-based compression via continuous block tracking (CBT). CBT assumes that the eventual blocks of data to be encoded are macroblocks or input blocks, the basic coding units of the encoder (which can vary in size depending on the codec), but CBT can begin by tracking data blocks of varying size. In one embodiment, hierarchical motion estimation (HME) [Bierling, M., 1988, "Displacement estimation by hierarchical blockmatching," Proc. SPIE 1001, Visual Communications and Image Processing, pp. 942-951] is applied to begin tracking data blocks much larger than the typical input block size. The HME tracking results for the larger blocks are then propagated to successively smaller blocks until motion vectors are estimated for the input blocks. HME provides the ability to track data at multiple resolutions, expanding the ability of the encoder to account for data at different scales.

The present invention generates frame-to-frame tracking results for each input block in the video data by application of conventional block-based motion estimation (BBME). If HME is applied, BBME is performed first on larger blocks of data and the resulting motion vectors are propagated to successively smaller blocks, until motion vectors for input blocks are calculated.

Frame-to-frame tracking results are then used to generate continuous tracking results for each input block in the video data, motion vectors that specify an input block's best match in reference frames that are not temporally adjacent to the current frame. In a typical GOP structure of IBBPBBP (consisting of I-frames, B-frames, and P-frames), for example, the reference frame can be as far away as three frames from the frame being encoded. Because frame-to-frame tracking results only specify motion vectors beginning at an input block location and likely point to a region in the previous frame that is not necessarily centered on an input block location, the frame-to-frame tracking results for all neighboring blocks in the previous frame must be combined to continue the "block track." This is the essence of continuous block tracking.

For a given input block, the motion vector from the CBT provides an initial estimate for the present invention's motion estimation. The initial estimate may be followed by a local search in the neighborhood of the initial estimate to obtain a fine estimate. The local search may be undertaken by full block search, diamond or hexagon search, or other fast search methods. The local estimate may be further refined by rate-distortion optimization to account for the best encoding mode (e.g., quantization parameter, subtiling, and reference frame, etc.), and then by subpixel refinement.

In an alternative embodiment, the CBT motion vector may be combined with EPZS candidates to form a set of initial estimates. The candidate set may be pruned through a preliminary "competition" that determines (via an approximate rate-distortion analysis) which candidate is the best one to bring forward. This "best" initial estimate then undergoes fine estimation (local search and subpixel refinement) and the later (full) rate-distortion optimization steps to select the encoding mode, etc. In another embodiment, multiple initial estimates may be brought forward to the subsequent encoding steps, for example the CBT motion vector and the "best" EPZS candidate. Full rate-distortion optimization at the final stage of encoding then selects the best overall candidate.

In another embodiment, the trajectories from continuous tracking results in past frames can be used to generate predictions in the current frame being encoded. This trajectory-based continuous block tracking (TB-CBT) prediction, which does not require new frame-to-frame tracking in the current frame, can either be added to an existing set of prediction candidates (which may include the CBT and EPZS candidates) or can replace the CBT in the candidate set. Regions in intermediate frames along trajectory paths may also be used as additional predictions. In a further embodiment, mode decisions along trajectory paths may be used to predict or prioritize mode decisions in the current input block being predicted.

In further embodiments, information about the relative quality of the tracks, motion vectors, and predictions generated by the CBT or TB-CBT can be computed at different points in the encoding process and then fed back into the encoder to inform future encoding decisions. Metrics such as motion vector symmetry and flat block detection may be used to assess how reliable track-based predictions from the CBT or TB-CBT are and to promote or demote those predictions relative to non-track-based predictions or intra-predictions accordingly.

In additional embodiments, motion vector directions and magnitudes along a CBT or TB-CBT track may be used to determine whether the motion of the input block being tracked is close to translational. If so, a translational motion model may be determined for that track, and points on the track may be analyzed for goodness-of-fit to the translational motion model. This can lead to better selection of reference frames for predicting the region. Translational motion model analysis may be extended to all input blocks in a frame as part of an adaptive picture type selection algorithm. To do this, one may determine whether a majority of blocks in the frame fit well to a frame-average translational motion model, leading to a determination of whether the motion in the frame is "well-modeled" and of which picture type would be most appropriate (B-frames well-modeled motion, P-frames for poorly-modeled motion).

Other embodiments may apply look-ahead tracking (LAT) to provide rate control information (in the form of quantization parameter settings) and scene change detection for the current frame being encoded. The LAT of the present invention is distinguished from other types of look-ahead processing because the complexity calculations that determine the look-ahead parameters are dependent on the continuous tracking results (CBT or TB-CBT).

The present invention is structured so that the resulting bitstream is compliant with any standard codec—including but not limited to MPEG-2, H.264, and HEVC—that employs block-based motion estimation followed by transform, quantization, and entropy encoding of residual signals.

Computer-based methods, codecs, and other computer systems and apparatus for processing video data may embody the foregoing principles of the present invention.

Methods, systems, and computer program products for encoding video data may be provided using continuous block tracking (CBT). A plurality of source video frames having non-overlapping input blocks may be encoded. For each input block to be encoded, continuous block tracking (CBT) may be applied for initial motion estimation within a model-based inter-prediction process to produce CBT motion vector candidates. Frame-to-frame tracking of each input block in a current frame referenced to a source video frame may be applied, which results in a set of frame-to-frame CBT motion vectors. The CBT motion vectors may be configured to specify, for each input block, a location of a matching region in a temporally-adjacent source video frame.

Continuous tracking over multiple reference frames may be provided by relating frame-to-frame motion vectors over the multiple reference frames. The continuous tracking may result in a set of continuous tracking motion vectors that are configured to specify, for each input block, a location of a matching region in a temporally non-adjacent source video frame. The continuous tracking motion vectors may be derived from frame-to-frame motion vectors by interpolating neighboring frame-to-frame motion vectors, in which the neighboring frame-to-frame motion vectors are weighted according to their overlap with the matching region indicated by the frame-to-frame motion vector.

CBT motion vector candidates with enhanced predictive zonal search (EPZS) motion vector candidates may be used to form an aggregate set of initial CBT/EPZS motion vector candidates. The CBT motion vector candidates may be determined by filtering the initial set of CBT/EPZS motion vector candidates separately using an approximate rate-distortion criterion, which results in a "best" CBT candidate and "best" EPZS candidate. Fine motion estimation may be performed on the best CBT and best EPZS candidates. The best initial inter-prediction motion vector candidates may be selected between the best CBT and the best EPZS motion vector candidates by means of rate-distortion optimization.

CBT motion vector candidates may be combined with enhanced predictive zonal search (EPZS) motion vector candidates, and this may be done at an earlier stage via approximate rate-distortion optimization. In this way, the CBT motion vector candidates and EPZS motion vector candidates may be unified, which results in a single "best" CBT/EPZS candidate. The fine motion estimation may be performed on the single best CBT/EPZS candidate. Encoding mode generation and final rate-distortion analysis may be used to determine the best inter-prediction motion vector candidate.

Methods, systems, and computer program products for encoding video data may be provided using trajectory based continuous block tracking (TB-CBT) prediction. Continuous tracking motion vectors may be selected that correspond to the at least one subject data block over multiple reference frames. The centers of the regions in the reference frames corresponding to the selected continuous tracking motion vectors may be related to form a trajectory based (TB) motion model that models a motion trajectory of the respective centers of the regions over the multiple reference frames. Using the formed trajectory motion model, a region in the current frame may be predicted. The predicted region may be determined based on a computed offset between the trajectory landing location in the current frame and the nearest data block in the current frame to determine TB-CBT predictions.

The TB-CBT predictions may be combined with enhanced predictive zonal search (EPZS) motion vector candidates to form an aggregate set of initial TB-CBT/EPZS motion vector candidates. The initial set of TB-CBT/EPZS motion vector candidates may be filtered separately by an approximate rate-distortion criterion, and this filtering results in a "best" TB-CBT candidate and "best" EPZS candidate. Fine motion estimation may be applied on the best TB-CBT and best EPZS candidate. The best initial inter-prediction motion vector candidates between the best TB-CBT and the best EPZS motion vector candidates may be selected by means of rate-distortion optimization.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, with emphasis instead placed on illustrating embodiments of the present invention.

FIG. 1 is a block diagram depicting a standard encoder configuration.

FIG. 2 is a block diagram depicting the steps involved in inter-prediction.

FIG. 3 is a block diagram depicting the steps involved in initial motion estimation via continuous block tracking, according to an embodiment of the invention.

FIG. 4 is a schematic diagram illustrating the operation of the hierarchical motion estimation algorithm.

FIG. 5 is a schematic diagram illustrating the derivation of continuous tracking motion vectors from frame-to-frame motion vectors, according to an embodiment of the invention.

FIG. 6 is a block diagram depicting unified motion estimation via a combination of continuous block tracking and enhanced predictive zonal search, according to an embodiment of the invention.

FIG. 7 is a block diagram illustrating the use of continuous block tracking trajectories to track into and produce predictions for the current frame.

FIG. 8 is a block diagram depicting the operation of look-ahead processing, according to an embodiment of the invention.

DETAILED DESCRIPTION

Figure 9A:
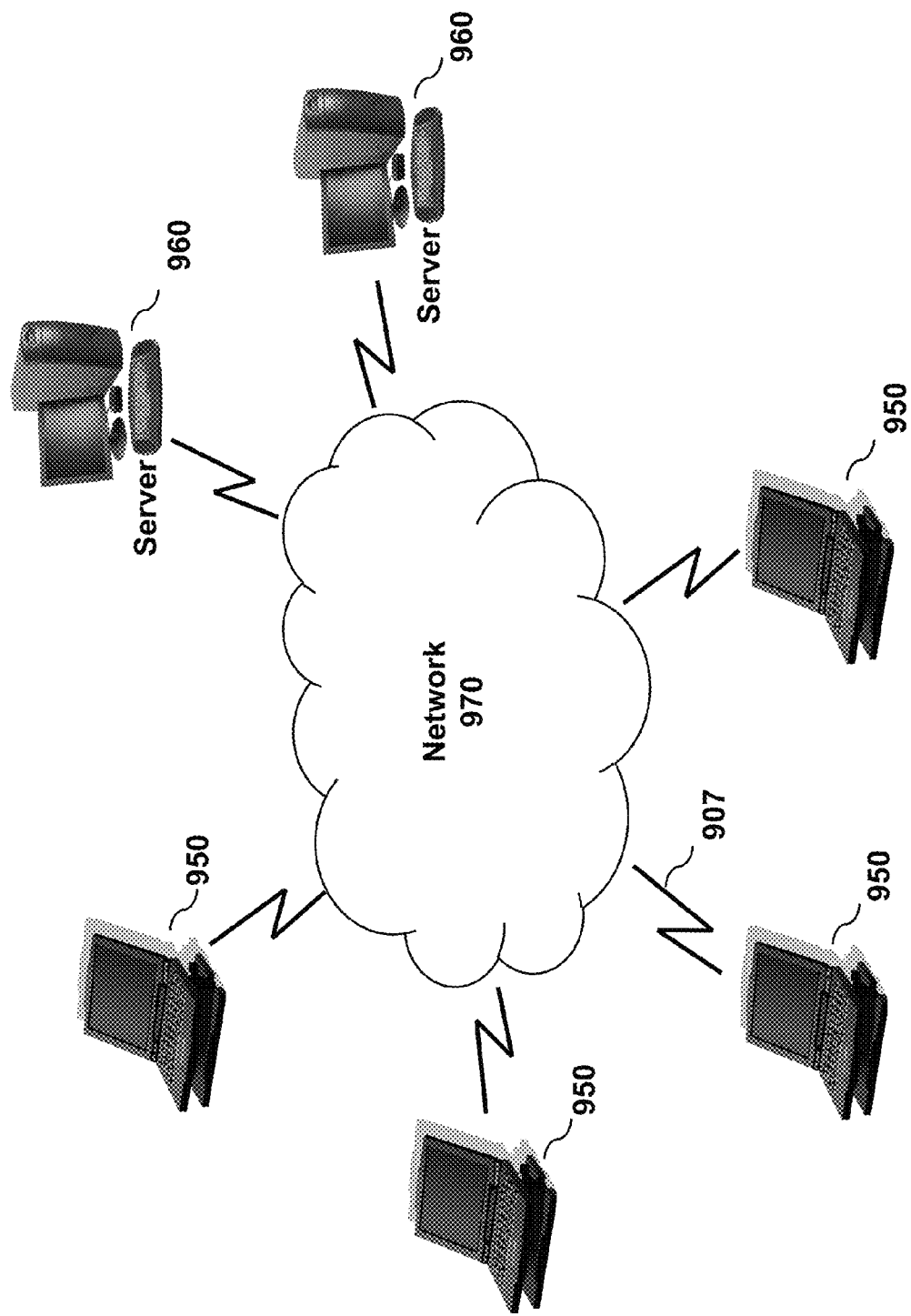
FIG. 9A is a schematic diagram of a computer network environment in which embodiments are deployed.

The teachings of all patents, published applications and references cited herein are incorporated by reference in their entirety. A description of example embodiments of the invention follows.

The invention can be applied to various standard encodings. In the following, unless otherwise noted, the terms "conventional" and "standard" (sometimes used together with "compression," "codecs," "encodings," or "encoders") can refer to MPEG-2, MPEG-4, H.264, or HEVC. "Input blocks" are referred to without loss of generality as the basic coding unit of the encoder and may also sometimes be referred to interchangeably as "data blocks" or "macroblocks."

Standard Inter-Prediction

The encoding process may convert video data into a compressed, or encoded, format. Likewise, the decompression process, or decoding process, may convert compressed video back into an uncompressed, or raw, format. The video compression and decompression processes may be implemented as an encoder/decoder pair commonly referred to as a codec.

FIG. 1 is a block diagram of a standard encoder. The encoder in FIG. 1 may be implemented in a software or hardware environment, or combination thereof. The encoder may include any combination of components, including, but not limited to, a motion estimation module 15 that feeds into an inter-prediction module 20, an intra-prediction module 30, a transform and quantization module 60, an inverse transform and quantization module 70, an in-loop filter 80, a frame store 85, and an entropy encoding module 90. For a given input video block 10 ("input block" for short, or macroblock or "data block"), the purpose of the prediction modules (both inter-prediction and intra-prediction) is to generate the best predicted signal 40 for the input block. The predicted signal 40 is subtracted from the input block 10 to create a prediction residual 50 that undergoes transform and quantization 60. The quantized coefficients 65 of the residual then get passed to the entropy encoding module 90 for encoding into the compressed bitstream. The quantized coefficients 65 also pass through the inverse transform and quantization module 70, and the resulting signal (an approximation of the prediction residual) gets added back to the predicted signal 40 to create a reconstructed signal 75 for the input block 10. The reconstructed signal 75 may be passed through an in-loop filter 80 such as a deblocking filter, and the (possibly filtered) reconstructed signal becomes part of the frame store 85 that aids prediction of future input blocks. The function of each of the components of the encoder shown in FIG. 1 is well known to one of ordinary skill in the art.

FIG. 2 depicts the steps in standard inter-prediction, where the goal is to encode new data using previously-decoded data from earlier frames, taking advantage of temporal redundancy in the data. In inter-prediction, an input block 10 from the frame currently being encoded is "predicted" from a region of the same size within a previously-decoded reference frame, stored in the frame store 85 from FIG. 1. The two-component vector indicating the (x, y) displacement between the location of the input block in the frame being encoded and the location of its matching region in the reference frame is termed a motion vector. The process of motion estimation thus involves determining the motion vector that best links an input block to be encoded with its matching region in a reference frame.

Most inter-prediction algorithms begin with initial motion estimation (110 in FIG. 2), which generates one or more rough estimates of "good" motion vectors 115 for a given input block. This is followed by an optional motion vector candidate filtering step 120, where multiple motion vector candidates can be reduced to a single candidate using an approximate rate-distortion metric. In rate-distortion analysis, the best motion vector candidate (prediction) is chosen as the one that minimizes the rate-distortion metric $D+\lambda R$, where the distortion D measures the error between the input block and its matching region, while the rate R quantifies the cost (in bits) to encode the prediction and $\lambda$ is a scalar weighting factor. The actual rate cost contains two components: texture bits, the number of bits needed to encode the quantized transform coefficients of the residual signal (the input block minus the prediction), and motion vector bits, the number of bits needed to encode the motion vector. Note that motion vectors are usually encoded differentially, relative to already-encoded motion vectors. In the early stages of the encoder, texture bits are not available, so the rate portion of the rate-distortion metric is approximated by the motion vector bits, which in turn are approximated as a motion vector penalty factor dependent on the magnitude of the differential motion vector. In the motion vector candidate filtering step 120, then, the approximate rate-distortion metric is used to select either a single "best" initial motion vector or a smaller set of "best" initial motion vectors 125. The initial motion vectors 125 are then refined with fine motion estimation 130, which performs a local search in the neighborhood of each initial estimate to determine a more precise estimate of the motion vector (and corresponding prediction) for the input block. The local search is usually followed by subpixel refinement, in which integer-valued motion vectors are refined to half-pixel or quarter-pixel precision via interpolation. The fine motion estimation block 130 produces a set of refined motion vectors 135.

Next, for a given fine motion vector 135, a mode generation module 140 generates a set of candidate predictions 145 based on the possible encoding modes of the encoder. These modes vary depending on the codec. Different encoding modes may account for (but are not limited to) interlaced vs. progressive (field vs. frame) motion estimation, direction of the reference frame (forward-predicted, backward-predicted, bi-predicted), index of the reference frame (for codecs such as H.264 and HEVC that allow multiple reference frames), inter-prediction vs. intra-prediction (certain scenarios allowing reversion to intra-prediction when no good inter-predictions exist), different quantization parameters, and various subpartitions of the input block. The full set of prediction candidates 145 undergoes "final" rate-distortion analysis 150 to determine the best single candidate. In "final" rate-distortion analysis, a precise rate-distortion metric $D+\lambda R$ is used, computing the prediction error D for the distortion portion and the actual encoding bits R (from the entropy encoding 90 in FIG. 1) for the rate portion. The final prediction 160 (or 40 in FIG. 1) is passed to the subsequent steps of the encoder, along with its motion vector and other encoding parameters.

As noted in the Introduction section, conventional inter-prediction is based on block-based motion estimation and compensation (BBMEC). The BBMEC process searches for the best match between the input block 10 and same-sized regions within previously-decoded reference frames. The simplest form of the BBMEC algorithm initializes the motion estimation using a (0, 0) motion vector, meaning that the initial estimate of the input block is the co-located block in the reference frame. Fine motion estimation is then performed by searching in a local neighborhood for the region that best matches (i.e., has lowest error in relation to) the input block. The local search may be performed by exhaustive query of the local neighborhood (termed here full block search) or by any one of several "fast search" methods, such as a diamond or hexagonal search.

As also noted in the Introduction section, the enhanced predictive zonal search (EPZS) algorithm [Tourapis, A., 2002] considers a set of initial motion estimates for a given input block, based on the motion vectors of neighboring blocks that have already been encoded, as well as the motion vectors of the co-located block (and neighbors) in the previous reference frame. The algorithm hypothesizes that the video's motion vector field has some spatial and temporal redundancy, so it is logical to initialize motion estimation for an input block with motion vectors of neighboring blocks. Once the set of initial estimates has been gathered (115 in FIG. 2), the EPZS algorithm performs motion vector candidate filtering 120 to narrow the set, after which fine motion estimation 130 is performed.

Inter-Prediction Via Continuous Block Tracking

FIG. 3 depicts how initial motion estimation can be performed during inter-prediction via continuous block tracking (CBT). CBT is useful when there is a gap of greater than one frame between the current frame being encoded and the reference frame from which temporal predictions are derived. For MPEG-2, even though a given frame to be encoded can have a maximum of two reference frames (one in the forward direction, one in the backward), the typical GOP structure of IBBPBBP (consisting of intra-predicted I-frames, bi-predicted B-frames, and forward-predicted P-frames) dictates that reference frames can be as many as three frames away from the current frame, because B-frames cannot be reference frames in MPEG-2. In H.264 and HEVC, which allow multiple reference frames, reference frames can be located six or more frames away from the current frame. When there is a greater-than-one-frame gap between the current frame and the reference frame, continuous tracking enables the encoder to capture motion in the data in a way that standard temporal prediction methods cannot, allowing CBT to produce superior temporal predictions.

The first step in CBT is to perform frame-to-frame tracking (210 in FIG. 3). In one embodiment of frame-to-frame tracking, for each input block 10 in the current video frame, conventional block-based motion estimation (BBME) is performed from the current frame to the most recent reference frame in the frame buffer 205. The frame-to-frame tracking occurs in both the forward and backward direction between the current frame and the most recent frame in the frame buffer. In a preferred embodiment, the frame buffer contains frames from the original source video. This is advantageous because source video frames are not corrupted by quantization and other coding artifacts, so tracking based on source video frames more accurately represents the true motion field in the video. This increased accuracy benefits downstream encoder processes such as scene change detection, rate control, and encoding mode selection. In an alternative embodiment, the frame buffer 205 contains a mix of source frames and reconstructed reference frames from the frame store (85 in FIG. 1). While this method is not as accurate as using the source video frames for tracking, it is less memory-intensive. BBME from the current frame to a reference frame (whether from the source video or reconstructed) can be carried out by performing a full block search (FBS) for the best matching region within a local neighborhood of the reference frame, with the FBS initialized at the location of the input block (i.e., a (0, 0) motion vector). The best matching region is defined as the region with lowest error (measured by, for example, sum of absolute differences or mean-squared error) relative to the input block. For CBT, frame-to-frame tracking is carried out in this way for every input block in every frame. In an alternative embodiment, the FBS in BBME may be replaced by any one of several fast search methods, such as a hexagonal or diamond search.

An alternative embodiment of frame-to-frame tracking via hierarchical motion estimation (HME) is illustrated in FIG. 4. In the basic HME algorithm [Bierling, 1988], an image pyramid is constructed where the lowest level is the original image, a frame from the input video, and upper levels are generated by filtering and downsampling lower-level images. Each level in the pyramid has one-quarter the number of samples as the level below it. After construction of the image pyramid, standard block-based motion estimation is applied to the top level of the pyramid. This results in coarse motion vector estimates over large regions, since the top level has been subsampled multiple times relative to the original video frame. In a three-level pyramid, for example, a 16×16 region in the top level corresponds to a 64×64 region in the bottom level. At each level of the pyramid, BBME is applied to each block (region) of the pyramid level, initialized at the location of the block (i.e., a (0, 0) motion vector). The fine search for BBME may be carried out via full block search or any one of several fast search methods such as a hexagonal or diamond search. In an alternative embodiment, the initial motion estimation for BBME in HME may supplement the (0, 0) motion vector with a set of motion vector candidates that includes the motion vectors of neighboring, already-searched blocks. This is helpful for tracking in high-complexity data. In this embodiment, the set of motion vector candidates is filtered to select the best candidate via approximate rate-distortion analysis as described above.

As shown in FIG. 4, coarse motion vectors from upper levels in the HME algorithm are propagated to lower levels to produce refined motion vector estimates. FIG. 4 shows a P×P data block 305 at a higher level 300 in the HME image pyramid, with corresponding motion vector $v_0$ (310). The motion vector $v_0$ is then propagated 315 to the lower level 320 by assigning $v_0$ as the starting point for motion estimation in the four (P/2)×(P/2) blocks corresponding in the lower level (320) to the single block 305 in the higher level (300). By beginning with coarse motion estimation over large, sparsely-sampled regions and refining the motion estimation to successively smaller and denser regions, the HME algorithm proves computationally efficient and provides the ability to track data at multiple resolutions, expanding the ability of the encoder to account for data at different scales. In a preferred embodiment, HME is applied to frames from the original source video, as noted for BBME above.

Returning to FIG. 3, frame-to-frame tracking 210 can thus be performed using either conventional BBME or HME. The result of frame-to-frame tracking is a set of frame-to-frame motion vectors 215 that signify, for each input block in a frame, the best matching region in the most recent frame in the frame buffer 205, and, for each block of the most recent frame in the frame buffer 205, the best matching region in the current frame. Continuous tracking 220 then aggregates available frame-to-frame tracking information to create continuous tracks across multiple reference frames for each input block. The continuous tracking process is illustrated in FIG. 5 over three consecutive frames, Frame t (400), Frame t-1 (415), and Frame t-2 (430), with Frame t-2 the earliest frame and Frame t the current frame being encoded. In FIG. 5, frame-to-frame tracking has calculated motion vector $v_0$ (405) for data block 401 in Frame t (with Reference Frame t-1), as well as motion vectors $v_1$ to $v_4$ for data blocks 420 in Frame t-1 (with Reference Frame t-2). The question of interest is where the best match for data block 401 would be in Reference Frame t-2. Note that the motion vector $v_0$ (405) points to a matching region 410 in Frame t-1 that does not coincide with any of the input blocks 420 for which frame-to-frame motion vectors exist. Continuous tracking for the data block 401 in Frame t thus needs to determine where the region 410 points to in Frame t-2, and doing this requires making use of the surrounding motion vectors $v_1$ to $v_4$. In a preferred embodiment ("interpolated neighboring"), the four surrounding motion vectors are interpolated based on the location of the matching region 410 relative to the surrounding input blocks, for example by weighting the respective motion vectors according to the number of overlapping pixels. In an alternative embodiment ("dominant neighboring"), the motion vector among the four surrounding motion vectors having the largest number of overlapping pixels is used to generate the matching region 410. In another embodiment ("lowest distortion"), matching regions corresponding to all four neighboring motion vectors are found, and the motion vector whose matching region has lowest error (measured, for example, by sum-of-absolute-differences or mean-squared error) is chosen. Returning to FIG. 3, the output of continuous tracking 220 are the continuous block tracking (CBT) motion vectors 225 that track all input blocks in the current frame being encoded to their matching regions in past reference frames. The CBT motion vectors are the initial motion vectors (125 in FIG. 2) for the CBT algorithm, and they can be refined with fine motion estimation (130 in FIG. 2) as noted above.

FIG. 6 depicts how the CBT algorithm can be combined with the EPZS algorithm to create a unified motion estimation algorithm, according to an embodiment of the invention. This type of unified motion estimation is attractive because CBT applies additional temporal information (region tracking from the original source video frames) to generate its motion vector candidates, while EPZS applies additional spatial and limited temporal information (motion vectors of spatially and temporally neighboring input blocks) to generate its motion vector candidates. In FIG. 6, CBT generates its motion vectors through frame-to-frame tracking 210 and continuous tracking 220 for initial motion estimation 110, followed by local search and subpixel refinement 250 for fine motion estimation 130. EPZS generates its initial motion vectors through a candidate generation module 230, followed by a candidate filtering module 240, with the filtering carried out via approximate rate-distortion analysis as detailed above. This is followed by fine motion estimation 130 via local search and subpixel refinement 260. The resulting CBT motion vector 255 and EPZS motion vector 265 are both passed forward to the remaining inter-prediction steps (mode generation 140 and final rate-distortion analysis 150 in FIG. 2) to determine the overall "best" inter-prediction.

In an alternative embodiment, the CBT and EPZS motion vector candidates 255 and 265 in FIG. 6 may be supplemented by additional candidates, including (but not limited to) random motion vectors, the (0, 0) motion vector, and the so-called "median predictor." Random motion vector candidates are helpful for high-complexity data, where the motion vector field may be complex or chaotic and the "correct" motion vector is not hinted at by either neighboring motion vectors (as provided by EPZS) or tracking information (as provided by CBT). The random motion vector may have fine motion estimation 130 applied to it to find the best candidate in its local neighborhood. The (0, 0) motion vector is one of the initial candidates in EPZS, but it is not always selected after EPZS candidate filtering (240 in FIG. 6), and even if it selected after candidate filtering, fine motion estimation 130 may result in a motion vector other than (0, 0). Explicitly including the (0, 0) motion vector (with no accompanying fine motion estimation) as a candidate for final rate-distortion analysis ensures that at least one low-magnitude, "low-motion" candidate is considered. Similarly, the "median predictor" is also one of the initial candidates in EPZS, but it is also not always selected after EPZS candidate filtering (240 in FIG. 6). The median predictor is defined as the median of the motion vectors previously calculated in the data blocks to the left, top, and top right of the data block currently being encoded. Explicitly including the median predictor (with no accompanying fine motion estimation) as a candidate for final rate-distortion analysis can be especially beneficial for encoding spatially homogeneous ("flat") regions of the video frame. In this alternative embodiment, then, five or more motion vector candidates may be passed forward to the remaining inter-prediction steps (mode generation 140 and final rate-distortion analysis 150 in FIG. 2), including (but not limited to) a CBT-derived motion vector, an EPZS-derived motion vector, a motion vector derived from a random motion vector, the (0, 0) motion vector, and the median predictor.

In a further embodiment, one or more of the candidates from the five or more streams may be filtered using approximate rate-distortion analysis as described above, to save on computations for the final rate-distortion analysis. Any combination of candidates from the five or more streams may be filtered or passed on to the remaining inter-prediction steps.

In another embodiment, the proximity of multiple initial estimates (the outputs of 110 in FIG. 6) may be taken into account to reduce computations in the fine motion estimation step 130. For example, if the CBT and EPZS initial motion vectors are close to each other, a single local search that encompasses both search regions may be implemented instead of two separate local searches.

While a few specific embodiments of unified motion estimation have been detailed above, the number and type of candidates, as well as the candidate filtering method, may vary depending on the application.

Extensions to Continuous Block Tracking

FIG. 7 illustrates how, according to an embodiment of the invention, continuous tracking results from past frames can be associated to form trajectories that can be used to generate predictions for the current frame being encoded. This trajectory-based continuous block tracking (TB-CBT) prediction does not require any additional frame-to-frame tracking from the current frame to the most recent reference frame, as the TB-CBT prediction is generated solely from past continuous tracking results.

FIG. 7 depicts the current frame being encoded, Frame t (700), as well as the three most recent reference frames, Frames t-1 (710), t-2 (720), and t-3 (730). For a given data block 715 in Frame t-1, there exists an associated motion vector $v_1$ (716) derived from frame-to-frame tracking, as described above. The motion vector $v_1$ points to a region 725 in Frame t-2. As described above, the continuous block tracker derives the motion vector $v_2$ (726) for the region 725 from the frame-to-frame motion vectors in the surrounding data blocks in Frame t-2. The motion vector $v_2$ then points to a region 735 in Frame t-3. The centers of the data block 715 in Frame t-1, the region 725 in Frame t-2, and the region 735 in Frame t-3 can then be associated to form a trajectory 750 over the reference frames.

The trajectory 750 can then be used to predict what region 705 in the current Frame t (700) should be associated with the motion of the content in the data block 715. The region 705 may not (and probably will not) be aligned with a data block (macroblock) in Frame t, so one can determine the nearest data block 706, with an offset 707 between the region 705 and the nearest data block 706.

Different types of TB-CBT predictors are possible, depending on how many reference frames are used to form the trajectory. In the trivial case, just the data block 715 in Frame t-1 is used, resulting in a $0^{th}$-order prediction, the (0, 0) motion vector, between Frame t and Frame t-1. Using Frames t-2 and t-1 to form the trajectory results in a $1^{st}$-order (linear) prediction. Using Frames t-3, t-2, and t-1 to form the trajectory results in a $2^{nd}$-order prediction, which is what is depicted for the trajectory 750 in FIG. 7. Higher-order predictions, based on polynomial curve-fitting using the appropriate degree polynomial, would result from using more than three reference frames. In each case, the trajectory points to a region 705 in Frame t, with an associated nearest data block 706 and an offset 707.

The TB-CBT prediction for the data block 706 is then determined by following the trajectory backward to the furthest reference frame in the trajectory. In FIG. 7, this is the region 735 in Frame t-3. The TB-CBT prediction for the data block 706 in Frame t is the region 740 in Frame t-3 that is offset from the trajectory region 735 by the same amount that the trajectory region 705 is offset from the nearest data block 706 in the current Frame t. In a further embodiment, different TB-CBT predictors may be derived from the trajectory regions in the intermediate reference frames in the trajectory (Frames t-2 and t-1 in FIG. 7) by following the same offset processing noted above. The different TB-CBT predictors corresponding to the different reference frames in the trajectory may be combined by taking an arithmetic mean of the predictors or by vectorizing the predictors, gathering the multiple vectorized predictors into an ensemble matrix, and performing singular value decomposition on the matrix to obtain the principal singular vector.

The TB-CBT predictors are derived without the need for any additional frame-to-frame tracking between the current Frame t and the most recent reference frame, Frame t-1, thus making the TB-CBT predictor computationally efficient. The TB-CBT predictor may either be added to the basic CBT predictor as another candidate in the rate-distortion optimization or can replace the CBT candidate.

In a further embodiment, the history of encoding mode selections (e.g., macroblock type, subpartition choice) along a trajectory can be used to prioritize or filter the encoding modes for the current data block being encoded. The encoding modes associated with a given trajectory would be derived from the encoding modes for the data blocks nearest the regions along the trajectory. Any encoding modes used in these data blocks would gain priority in the rate-distortion optimization (RDO) process for the current data block, since it is likely that the content of the data represented by the trajectory could be efficiently encoded in the same way. Other encoding modes that are very different from the prioritized encoding modes, and thus unlikely to be chosen, could be eliminated (filtered) from the RDO process for the current data block, thereby saving computations.

In further embodiments, information about the relative quality of the tracks, motion vectors, and predictions generated by the CBT or TB-CBT can be computed at different points in the encoding process and then used to inform current and future tracking and encoding decisions.

In one embodiment, rate-distortion "scores" (the values of the final rate-distortion metric $D+\lambda R$) from neighboring, already-encoded input blocks may be fed back to the encoding of the current input block to determine how many motion vector candidates should be passed forward to final rate-distortion analysis. For example, low rate-distortion scores indicate good prediction in the neighboring input blocks, meaning that the random motion vector candidate, the median predictor, and the (0, 0) candidate may not be needed for the current input block. By contrast, high rate-distortion scores indicate poor prediction in the neighboring input blocks, meaning that all candidate types—and possibly multiple EPZS candidates—should be sent to final rate-distortion analysis. In a further embodiment, the number of candidates to pass forward to final rate-distortion analysis may be scaled inversely to the rate-distortion scores. In this embodiment, the candidates are ranked according to their approximate rate-distortion metric values, with lower values indicating higher priority.

In an alternative embodiment, statistics for rate-distortion scores can be accumulated for the most recent reference frame[s], and these statistics can be used to calculate a threshold for filtering the prediction candidates in the current frame being encoded. For example, one could derive a threshold as the $75^{th}$ or $90^{th}$ percentile of rate-distortion scores (sorted from largest to smallest) in the most recent encoded frame[s]. In the current frame, any candidates whose approximate rate-distortion scores are higher than the threshold could then be removed from consideration for final rate-distortion analysis, thereby saving computations.

In another embodiment, the quality of the tracks generated by the CBT (or the TB-CBT) and the quality of the corresponding CBT-based motion vectors can be measured and used to inform current and future tracking and encoding decisions. For example, motion vector symmetry [Bartels, C. and de Haan, G., 2009, "Temporal symmetry constraints in block matching," Proc. IEEE $13^{th}$ Int'l. Symposium on Consumer Electronics, pp. 749-752], defined as the relative similarity of pairs of counterpart motion vectors when the temporal direction of the motion estimation is switched, is a measure of the quality of calculated motion vectors (the higher the symmetry, the better the motion vector quality). The "symmetry error vector" is defined as the difference between the motion vector obtained through forward-direction motion estimation and the motion vector obtained through backward-direction motion estimation. Low motion vector symmetry (a large symmetry error vector) is often an indicator of the presence of complex phenomena such as occlusions (one object moving in front of another, thus either covering or revealing the background object), motion of objects on or off the video frame, and illumination changes, all of which make it difficult to derive accurate motion vectors.

In one embodiment, motion vector symmetry is measured for frame-to-frame motion vectors in the HME framework, so that coarse motion vectors in the upper levels of the HME pyramid with high symmetry are more likely to be propagated to the lower levels of the HME pyramid; whereas low-symmetry motion vectors in the upper levels of the HME pyramid are more likely to be replaced with alternative motion vectors from neighboring blocks that can then be propagated to the lower levels of the HME pyramid. In one embodiment, low symmetry is declared when the symmetry error vector is larger in magnitude than half the extent of the data block being encoded (e.g., larger in magnitude than an (8, 8) vector for a 16×16 macroblock). In another embodiment, low symmetry is declared when the symmetry error vector is larger in magnitude than a threshold based on motion vector statistics derived during the tracking process, such as the mean motion vector magnitude plus a multiple of the standard deviation of the motion vector magnitude in the current frame or some combination of recent frames.

In another embodiment, the motion vector symmetry measured during HME frame-to-frame tracking may be combined with prediction error measurements to detect the presence of occlusions and movement of objects onto or off the video frame (the latter henceforth referred to as "border motion" for brevity). Prediction error may be calculated, for example, as the sum of absolute differences (SAD) or sum of squared differences (SSD) between pixels of the data block being encoded and pixels of a region in a reference frame pointed to by a motion vector. When occlusion or border motion occurs, the motion vector symmetry will be low, while the error in one direction (either forward, where the reference frame is later than the current frame, or backward, where the reference frame is previous to the current frame) will be significantly lower than the error in the other. In this case, the motion vector that produces the lower error is the more reliable one.

In a further embodiment for low motion vector symmetry cases, data blocks in a "higher error" direction (as defined above) may be encoded with high fidelity using intra-prediction. Such a scenario likely occurs because the content of the data block has been revealed (after being occluded) or has come onto the video frame, making good inter-predictions for that data block unlikely. This dictates intra-prediction for that data block.

In a further embodiment for low motion vector symmetry cases, identification of data blocks in a "lower error" direction (as defined above) may be used to eliminate regions and reference frames in the other, "higher error" direction as future candidates for motion estimation. This elimination also removes bidirectional motion estimation candidates (in which predictions are a combination of regions in the forward and backward directions) from consideration, since one direction is unreliable. Besides eliminating candidates that are likely to be inaccurate (because of occlusions or motion off the video frame), this process has the additional benefit of reducing the number of candidates considered during rate-distortion optimization, thus reducing computation time.

In another embodiment, the motion vector symmetry measured during HME frame-to-frame tracking may be combined with prediction error measurements to detect the presence of illumination changes such as flashes, fades, dissolves, or scene changes. In contrast to the occlusion/border motion scenario above, illumination changes may be indicated by low motion vector symmetry and high error in both directions (forward and backward). In a further embodiment, detection of such illumination changes may dictate a de-emphasis of tracking-based candidates (such as from the CBT or TB-CBT) in favor of non-tracking-based candidates such as EPZS candidates, the (0, 0) motion vector, or the median predictor. In an alternative embodiment, detection of illumination changes may be followed by weighted bidirectional prediction using CBT or TB-CBT motion vectors (and corresponding reference frame regions) in both directions, with the weightings determined by measurements of average frame intensities in the forward and backward directions.

In another embodiment, a flat block detection algorithm can be applied during the first stages (upper levels) of HME tracking to determine the presence of "flat blocks" in the data, homogeneous (or ambiguous) regions in the data that usually result in inaccurate motion vectors. Flat blocks may be detected, for example, using an edge detection algorithm (where a flat block would be declared if no edges are detected in a data block) or by comparing the variance of a data block to a threshold (low variance less than the threshold would indicate a flat block). Similar to the use of the motion vector symmetry metric, flat block detection would dictate replacing the motion vectors for those blocks with motion vectors from neighboring blocks, prior to propagation to the lower levels of the HME pyramid. In another embodiment, flat block detection would dictate an emphasis on the (0, 0) motion vector candidate or the median predictor, since it is likely that, in a flat region, many different motion vectors will produce similar errors. In this case, the (0, 0) motion vector is attractive because it requires few bits to encode and is unlikely to produce larger prediction error than other motion vectors with larger magnitudes. The median predictor is desirable in flat block regions because it provides a consensus of motion vectors in neighboring blocks, preventing the motion vector field from becoming too chaotic due to small fluctuations in the pixels in the flat block region.

In further embodiments, metrics such as motion vector symmetry and flat block detection could be accumulated from multiple frame-to-frame tracking results associated with a continuous track, to determine a cumulative track quality measure that could be associated with the resulting CBT motion vector. This track quality measure could then be used to determine the relative priority of the CBT motion vector in the rate-distortion analysis compared to other (non-tracker-based) candidates. A high quality track (corresponding to high motion vector symmetry and no flat block detection for the motion vectors and regions along the track) would indicate higher priority for the CBT candidate. Additionally, a high track quality score could be used to override a "skip" mode decision from the encoder for the data block being encoded, in favor of the CBT candidate.

Additional statistics based on motion vector directions and magnitudes along CBT tracks may be used to improve encoding choices. In one embodiment, motion vector directions and magnitudes along a CBT track may be used to determine whether the motion of the region being tracked is close to translational, in which case the directions and magnitudes of the motion vectors along the track would be nearly constant. Non-constant motion vector magnitudes would indicate motion acceleration, a violation of the constant-velocity assumption of translational motion. Non-constant motion vector directions would violate the "straight-line" assumption of translational motion. If most points along a CBT track fit well to a particular translational motion model, one could observe the points that do not fit the model well. In one embodiment, the reference frames corresponding to the points along a CBT track that do not fit the translational motion model for the track may be excluded from rate-distortion analysis, as the regions in those reference frames would be unlikely to provide good predictions for the data block being encoded in the current frame. Goodness of fit of a particular point on a track to the translational motion model for that track may be determined, for example, by percentage offset of the motion vector magnitude from the constant velocity of the translational motion model and by percentage offset of the motion vector direction from the direction indicated by the translational motion model. The exclusion of certain reference frames from rate-distortion analysis, besides eliminating candidates that are likely to be inaccurate (because of poor fit to the motion of the region being tracked), will also reduce the number of candidates considered during rate-distortion optimization, thus reducing computation time.

In another embodiment, translational motion model analysis as above may be extended to the CBT tracks for all data blocks in a frame, as part of an adaptive picture type selection algorithm. In one embodiment, each CBT track is examined for translational motion model fit, and an average translational motion model is determined for the entire frame (tracks not fitting a translational motion model are excluded from the frame average motion model calculation). If a majority of data blocks in the frame show translational motion close to the frame average motion model (or the "global motion" of the frame), the motion in that frame is determined to be "well-modeled," indicating that the frame should be encoded as a B-frame. If most of the data blocks in the frame do not show translational motion or show multiple translational motion models not close to the frame average motion model, the motion in that frame is determined to be "not well-modeled," indicating that the frame should be encoded as a P-frame.

In another embodiment, either trajectory analysis or translational motion model analysis as described above may be used to provide additional predictors in cases where motion vectors from frame-to-frame motion estimation are unreliable. Trajectory-based candidates are desirable in cases when the best predictor for the current data block is not nearby temporally (i.e., regions in the most recent reference frames) but resides in a more distant reference frame. Such cases may include periodic motion (e.g., a carousel), periodic illumination changes (e.g., strobe lights), and occlusions. Translational motion model analysis can provide better predictors through the estimated global motion of the frame when the best prediction for the current data block is not available through either frame-to-frame motion estimation or through motion vectors in neighboring blocks, but is better indicated by the overall motion in the frame. Such cases may include chaotic foreground motion against steady background motion (e.g., confetti at a parade) and flat blocks.

FIG. 8 shows how the CBT can be combined with look-ahead processing to improve overall encoder performance, according to an embodiment of the invention. Note that FIG. 8 displays only those steps from the general encoding stream in FIG. 1 that relate to look-ahead processing. In FIG. 8, the video source (the input video) 800 is gathered frame by frame into a frame buffer 810. Each frame is divided into input video blocks 10 and encoded as in FIG. 1. The CBT operates as part of a look-ahead processing module 815 that performs tracking computations ahead of time and feeds back information to the current frame being encoded. This form of look-ahead processing is thus termed look-ahead tracking (LAT). In the LAT, one or more frames from the frame buffer 810 are gathered into a look-ahead frame buffer 820, and continuous block tracking 830 (including frame-to-frame tracking 210 and continuous tracking 220 from FIG. 3) is performed on the blocks in those frames.

Once the CBT motion vectors are generated from the application of CBT 830, the next step is to perform a frame complexity analysis 840 on each of the future frames, based on the relative accuracy of the motion estimation. In one embodiment, the complexity of a frame is measured by summing the error of each input block in the frame (measured using sum-of-absolute-differences or mean-squared error) when compared with its matching region (the region pointed to by its motion vector) in the previous frame. The frame complexity is thus the sum of all the block error values. Rate control 860 then updates the quantization parameter (QP) 865 for the current frame according to the ratio of the complexity of the future frame to the complexity of the current frame. The idea is that if it is known that a more complex frame is upcoming, the current frame should be quantized more (resulting in fewer bits spent on the current frame) so that more bits are available to encode the future frame. The updated QP value 865 modifies both the encoding modes 140 for inter- and intra-prediction 870 as well as the later quantization step 60 where the residual signal is transformed and quantized. The LAT of the present invention is distinguished from other types of look-ahead processing because the complexity calculations that determine the look-ahead parameters are dependent on continuous tracking results.

In another embodiment, the frame complexity analysis 840 in the look-ahead processing module 815 is used to detect scene changes. This is particularly important for encoding based on the CBT, because tracking through scene changes results in inaccurate motion vectors. One way to use the frame complexity analysis 840 for scene change detection is to monitor the frame error as a time series over several frames and look for local peaks in the frame error time series. In one embodiment, a frame is declared a local peak (and a scene change detected) if the ratio of that frame's error to the surrounding frames' errors is higher than some threshold. Small windows (for example, up to three frames) can be applied in calculating the surrounding frames' errors to make that calculation more robust. Once a scene change is detected, the encoder is instructed to encode that frame as an I-frame (intra-prediction only) and to reset all trackers (frame-to-frame and continuous trackers). Again, this type of scene change detection is distinguished from conventional types of scene change detection because the LAT outputs are dependent on continuous tracking results.

Digital Processing Environment

Example implementations of the present invention may be implemented in a software, firmware, or hardware environment. FIG. 9A illustrates one such environment. Client computer(s)/devices 950 (e.g., mobile phones or computing devices) and a cloud 960 (or server computer or cluster thereof) provide processing, storage, encoding, decoding, and input/output devices executing application programs and the like.

Client computer(s)/devices 950 can also be linked through communications network 970 to other computing devices, including other client devices/processes 950 and server computer(s) 960. Communications network 970 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic devices/computer network architectures are suitable.

Figure 9B:
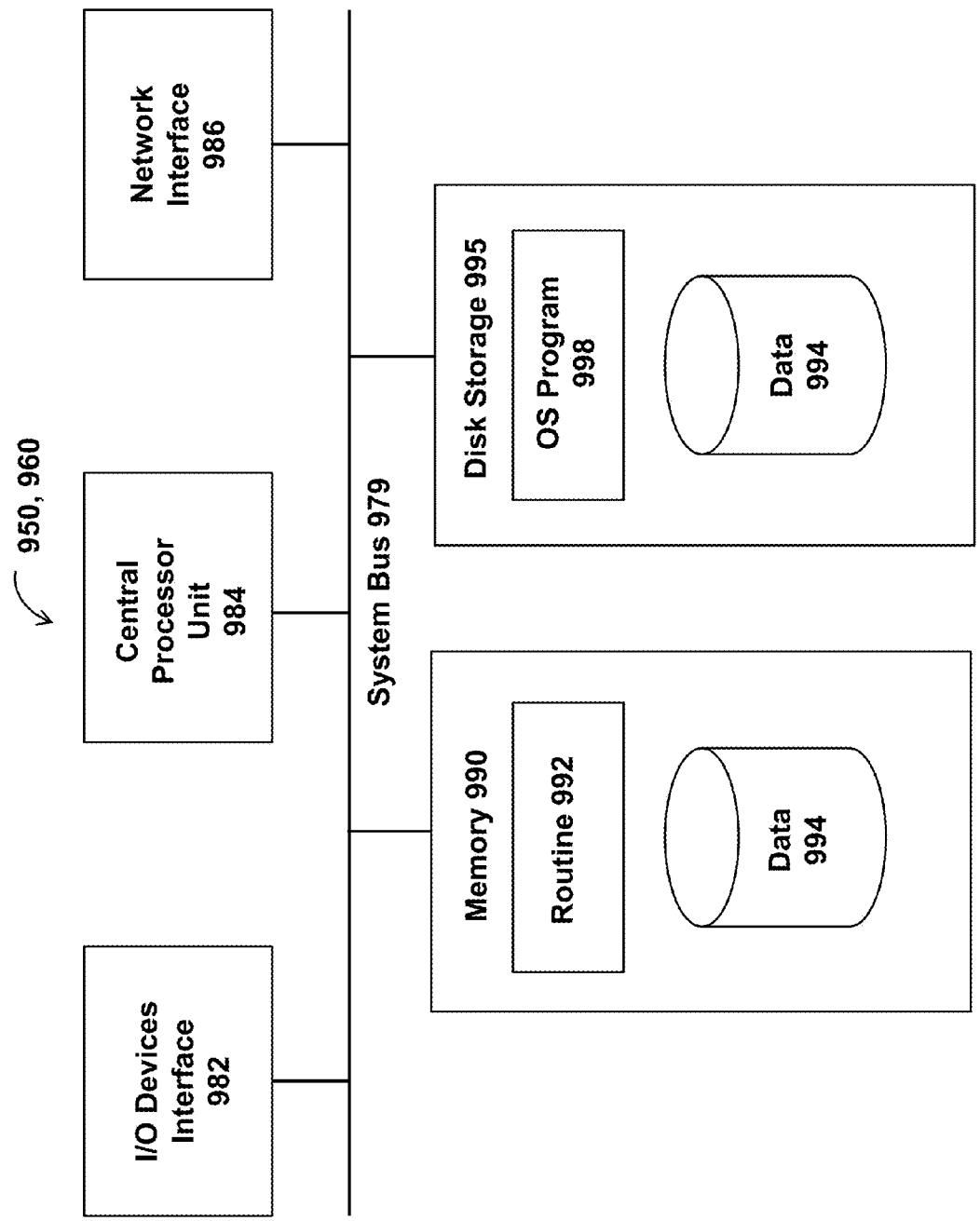
FIG. 9B is a block diagram of the computer nodes in the network of FIG. 9A.

Embodiments of the invention may include means for encoding, tracking, modeling, decoding, or displaying video or data signal information. FIG. 9B is a diagram of the internal structure of a computer/computing node (e.g., client processor/device/mobile phone device/tablet 950 or server computers 960) in the processing environment of FIG. 9A, which may be used to facilitate encoding such videos or data signal information. Each computer 950, 960 contains a system bus 979, where a bus is a set of actual or virtual hardware lines used for data transfer among the components of a computer or processing system. Bus 979 is essentially a shared conduit that connects different elements of a computer system (e.g., processor, encoder chip, decoder chip, disk storage, memory, input/output ports, etc.) that enables the transfer of data between the elements. Attached to the system bus 979 is an I/O device interface 982 for connecting various input and output devices (e.g., keyboard, mouse, displays, printers, speakers, etc.) to the computer 950, 960. Network interface 986 allows the computer to connect to various other devices attached to a network (for example, the network illustrated at 970 of FIG. 9A). Memory 990 provides volatile storage for computer software instructions 992 and data 994 used to implement a software implementation of the present invention (e.g., codec, video encoder/decoder code).

Disk storage 995 provides non-volatile storage for computer software instructions 998 (equivalently "OS program") and data 994 used to implement an embodiment of the present invention: it can also be used to store the video in compressed format for long-term storage. Central processor unit 984 is also attached to system bus 979 and provides for the execution of computer instructions. Note that throughout the present text, "computer software instructions" and "OS program" are equivalent.

In one example, an encoder may be configured with computer readable instructions 992 to provide continuous block tracking (CBT) in a model-based inter-prediction and encoding scheme. The CBT may be configured to provide a feedback loop to an encoder (or elements thereof) to optimize the encoding of video data.

In one embodiment, the processor routines 992 and data 994 are a computer program product, with encoding that includes a CBT engine (generally referenced 992), including a computer readable medium capable of being stored on a storage device 994 which provides at least a portion of the software instructions for the CBT.

The computer program product 992 can be installed by any suitable software installation procedure, as is well known in the art. In another embodiment, at least a portion of the CBT software instructions may also be downloaded over a cable, communication, and/or wireless connection. In other embodiments, the CBT system software is a computer program propagated signal product 907 (in FIG. 9A) embodied on a nontransitory computer readable medium, which when executed can be implemented as a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 992.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 992 is a propagation medium that the computer system 950 may receive and read, such as by receiving the propagation medium and identifying a propagated signal embodied in the propagation medium, as described above for the computer program propagated signal product.

While this invention has been particularly shown and described with references to example embodiments thereof, it will be understood by those skilled in the art that various changes in form and details may be made therein without departing from the scope of the invention encompassed by the appended claims.

What is claimed is:

1. A method of encoding video data, the method comprising:
   processing a plurality of source video frames having non-overlapping input blocks to be encoded; and
   for each input block to be encoded, applying continuous block tracking (CBT) for initial motion estimation within a model-based inter-prediction process to produce CBT motion vector candidates by:
   providing frame-to-frame tracking of each input block in a current frame referenced to a source video frame resulting in a set of frame-to-frame motion vectors configured to specify, for each input block, a location of a matching region in a temporally-adjacent source video frame; and
   providing continuous tracking over multiple reference frames by relating frame-to-frame motion vectors over the multiple reference frames, the continuous tracking resulting in a set of continuous tracking motion vectors configured to specify, for each input block, a location of a matching region in a temporally non-adjacent source video frame; and
   combining the CBT motion vector candidates with enhanced predictive zonal search (EPZS) motion vector candidates to form an aggregate set of initial CBT/EPZS motion vector candidates in a unified motion estimation framework.

2. The method as in claim 1 wherein the CBT motion vector candidates are determined by:
   filtering the initial set of CBT/EPZS motion vector candidates separately by an approximate rate-distortion criterion, resulting in a "best" CBT candidate and "best" EPZS candidate;
   performing fine motion estimation on the best CBT and best EPZS candidates; and
   selecting the best initial inter-prediction motion vector candidates between the best CBT and the best EPZS motion vector candidates by means of rate-distortion optimization.

3. The method as in claim 1 wherein the combining the CBT motion vector candidates with enhanced predictive zonal search (EPZS) motion vector candidates is done at an earlier stage via approximate rate-distortion optimization, causing the CBT motion vector candidates and EPZS motion vector candidates to be unified, resulting in a single "best" CBT/EPZS candidate, and
   wherein fine motion estimation is performed on the single best CBT/EPZS candidate.

4. The method as in claim 2 wherein selecting the best inter-prediction motion vector candidates further includes using encoding mode generation and final rate-distortion analysis to determine the best inter-prediction motion vector candidate.

5. The method as in claim 2 wherein filtering the initial set of CBT/EPZS motion vector candidates further includes refining the combined CBT/EPZS motion vector candidates using feedback from rate-distortion scores of neighboring blocks, the feedback determining the number of candidates to pass forward for final rate-distortion optimization.

6. The method as in claim 1 wherein combining the CBT motion vector candidates with the EPZS motion vector candidates further includes supplementing the combined CBT and EPZS motion vector candidates with one or more additional candidates including at least one of: a random motion vector candidate, a median predictor, and a (0, 0) motion vector candidate.

7. The method as in claim 6 wherein the random motion vector candidate is configured with fine motion estimation to find the best candidate in its local neighborhood.

8. The method as in claim 6 wherein the (0, 0) motion vector does not undergo fine motion estimation and is explicitly included as a candidate in final rate-distortion optimization.

9. The method as in claim 2 wherein filtering the initial set of CBT/EPZS motion vector candidates further includes removing duplicate motion vector estimates using a proximity criterion.

10. The method as in claim 1 wherein the predictive zonal search (EPZS) motion vector candidates are constructed by:
    generating a set of initial motion candidates for the input block, based on (i) motion vectors of neighboring blocks that have already been encoded, and (ii) motion vectors of a co-located block and neighboring blocks in a previous reference frame;
    using the EPZS, filtering the initial set of motion candidates to narrow the set; and
    performing fine motion estimation on the narrowed set to select the EPZS motion vector candidates.

11. A video compression system for encoding video data comprising:
    a video encoder configured to compress video data by:
    processing a plurality of source video frames having non-overlapping input blocks to be encoded; and
    for each input block to be encoded, applying continuous block tracking (CBT) for initial motion estimation within a model-based inter-prediction process to produce CBT motion vector candidates by:
    providing frame-to-frame tracking of each input block in a current frame referenced to a source video frame resulting in a set of frame-to-frame motion vectors configured to specify, for each input block, a location of a matching region in a temporally-adjacent source video frame; and
    providing continuous tracking over multiple reference frames by relating frame-to-frame motion vectors over the multiple reference frames, the continuous tracking resulting in a set of continuous tracking motion vectors configured to specify, for each input block, a location of a matching region in a temporally non-adjacent source video frame; and
    combining the CBT motion vector candidates with enhanced predictive zonal search (EPZS) motion vector candidates to form an aggregate set of initial CBT/EPZS motion vector candidates in a unified motion estimation framework.

12. The video compression system as in claim 11 wherein the CBT motion vector candidates are determined by:
    filtering the initial set of CBT/EPZS motion vector candidates separately by an approximate rate-distortion criterion, resulting in a "best" CBT candidate and "best" EPZS candidate;
    performing fine motion estimation on the best CBT and best EPZS candidates; and
    selecting the best initial inter-prediction motion vector candidates between the best CBT and the best EPZS motion vector candidates by means of rate-distortion optimization.

13. The video compression system as in claim 11 wherein the combining the CBT motion vector candidates with enhanced predictive zonal search (EPZS) motion vector candidates is done at an earlier stage via approximate rate-distortion optimization, causing the CBT motion vector candidates and EPZS motion vector candidates to be unified, resulting in a single "best" CBT/EPZS candidate, and wherein fine motion estimation is performed on the single best CBT/EPZS candidate.

14. The video compression system as in claim 12 wherein selecting the best inter-prediction motion vector candidates further includes using encoding mode generation and final rate-distortion analysis to determine the best inter-prediction motion vector candidate.

15. The video compression system as in claim 12 wherein filtering the initial set of CBT/EPZS motion vector candidates further includes refining the combined CBT/EPZS motion vector candidates using feedback from rate-distortion scores of neighboring blocks, the feedback determining the number of candidates to pass forward for final rate-distortion optimization.

16. The video compression system as in claim 11 wherein combining the CBT motion vector candidates with the EPZS motion vector candidates further includes supplementing the combined CBT and EPZS motion vector candidates with one or more additional candidates including at least one of: a random motion vector candidate, a median predictor, and a (0, 0) motion vector candidate.

17. The video compression system as in claim 16 wherein the random motion vector candidate is configured with fine motion estimation to find the best candidate in its local neighborhood.

18. The video compression system as in claim 16 wherein the (0, 0) motion vector does not undergo fine motion estimation and is explicitly included as a candidate in final rate-distortion optimization.

19. The video compression system as in claim 12 wherein filtering the initial set of CBT/EPZS motion vector candidates further includes removing duplicate motion vector estimates using a proximity criterion.

20. The video compression system as in claim 11 wherein the predictive zonal search (EPZS) motion vector candidates are constructed by:

generating a set of initial motion candidates for the input block, based on (i) motion vectors of neighboring blocks that have already been encoded, and (ii) motion vectors of a co-located block and neighboring blocks in a previous reference frame;

using the EPZS, filtering the initial set of motion candidates to narrow the set; and performing fine motion estimation on the narrowed set to select the EPZS motion vector candidates.

* * * * *